United States Patent
Lu

(10) Patent No.: US 7,142,211 B2
(45) Date of Patent: *Nov. 28, 2006

(54) GRAPHIC ENGINE FOR FILL STYLE TRANSFERRING IN A RESOURCE-CONSTRAINED DEVICE

(75) Inventor: Shuijun Lu, Zhejiang (CN)

(73) Assignee: ArcSoft, Inc., Fremont, CA (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/614,945

(22) Filed: Jul. 7, 2003

(65) Prior Publication Data

US 2005/0007366 A1    Jan. 13, 2005

(51) Int. Cl.
*G06T 11/20* (2006.01)
*G09G 5/22* (2006.01)

(52) U.S. Cl. .................. 345/441; 345/440
(58) Field of Classification Search ......... 345/440–443
See application file for complete search history.

(56) References Cited

U.S. PATENT DOCUMENTS

| | | | |
|---|---|---|---|
| 5,123,085 A * | 6/1992 | Wells et al. ............... 345/421 |
| 5,241,654 A | 8/1993 | Kai et al. |
| 5,301,267 A | 4/1994 | Hassett et al. |
| 5,638,503 A | 6/1997 | Hoel |
| 5,771,341 A | 6/1998 | Huddy |
| 5,781,262 A | 7/1998 | Suzuki et al. |
| 5,818,459 A | 10/1998 | Kurumida |
| 5,838,329 A | 11/1998 | Day |
| 6,081,314 A | 6/2000 | Suzuki et al. |
| 6,323,922 B1 | 11/2001 | Suzuki et al. |
| 6,356,263 B1 | 3/2002 | Migdal et al. |
| 6,674,435 B1 | 1/2004 | Payne et al. |
| 6,867,778 B1 | 3/2005 | Tang et al. |
| 6,876,366 B1 | 4/2005 | Chen |
| 6,882,343 B1 | 4/2005 | Kuo |
| 6,900,803 B1 | 5/2005 | Shehane et al. |
| 2004/0006749 A1 | 1/2004 | Fux et al. |
| 2004/0105579 A1 | 6/2004 | Ishii et al. |
| 2004/0207642 A1* | 10/2004 | Crisu et al. ............... 345/626 |

OTHER PUBLICATIONS

Foley, Jim et al. "Computer Graphics: Principles and Practice". 1997, Addison-Wesley Publishing Company. Reading, Massachusetts.*

Nakamae, E.; Ishizaki, T.; Nishita, T.; Takita, S. "Compositing 3D Images with Antialiasing and Various Shading Effects." Computer Graphics and Applications, IEEE. vol. 9, Issue 2, Mar. 1989 pp. 21-29□□.*

(Continued)

*Primary Examiner*—Mark Zimmerman
*Assistant Examiner*—Eric Woods
(74) *Attorney, Agent, or Firm*—Patent Law Group LLP; David C. Hsia

(57) ABSTRACT

A method is provided for determining fill styles for pixels. A parameter "sum fill" is calculated for each pixel. Parameter sum fill is the sum of the difference between the right fill style and the left fill style of each edge that touches the bottom border of a pixel. A parameter "fa" is then calculated for each pixel. Parameter fa is the sum of the parameters sum fill of the current pixel and the preceding pixels. The fill style of a pixel that is untouched by any edges is set equal to the parameter fa of the adjacent pixel to its right.

3 Claims, 12 Drawing Sheets

OTHER PUBLICATIONS

Foley et al., "Computer Graphics: Principles and Practice," 1990, Addison-Wesly Publishing Company, Second edition, pp. 513, 514.

Gao et al., "Approximate Implicitization of Planar Parametric Curves using Quadratic Splines," MM Research Prepints, 2002, pp. 52-63.

Sunday, "Basic Linear Algebra," 2002, softsurfer.com, pg. 8.

Sweedyk, "CS181a: Computer Animation, Curves & Curved Surfaces," 2002, cs181a.lec03.pdf, slides 4-6 and 32-35.

"Postulates, Theorems, and Corollaries from Geometry," downloaded on Oct. 14, 2005 from http://users.adelphia.net/—mathhomeworkhelp/geometry.html, pp. 1-7.

* cited by examiner

GRAPHIC ENGINE FOR FILL STYLE TRANSFERRING IN A RESOURCE-CONSTRAINED DEVICE

CROSS REFERENCE TO RELATED APPLICATIONS

This application is related to U.S. patent application Ser. No. 10/614,876, entitled "GRAPHIC ENGINE FOR APPROXIMATING A QUADRATIC BEZIER CURVE IN A RESOURCE-CONSTRAINED DEVICE," U.S. patent application Ser. No. 10/614,879, entitled "GRAPHIC ENGINE FOR RASTERIZING A STRAIGHT EDGE IN A RESOURCE-CONSTRAINED DEVICE," and U.S. patent application Ser. No. 10/614,883, now U.S. Pat. No. 6,876,366, entitled "GRAPHIC ENGINE FOR HANDLING SUB-PIXEL REGIONS IN A RESOURCE-CONSTRAINED DEVICE," which are concurrently filed, commonly assigned, and incorporated herein by reference.

FIELD OF INVENTION

This invention relates to a graphic engine for rendering images on a resource-constrained device such as a cellular phone or a handheld.

DESCRIPTION OF RELATED ART

Graphic engines are used to transform (e.g., vector-based graphical) data in graphic files, such as edges and fill styles, into a raster image (i.e., pixel values) for display on a screen. As portable devices such as cellular phones and handhelds (e.g., a Palm devices) become increasing popular, these devices are expected to handle more and more complicated graphics despite their slow processors and limited memories. Thus, what is needed is a graphic engine for portable devices that provides good rasterization while utilizing limited resources.

SUMMARY

In one embodiment of the invention, a method for determining fill styles for pixels in a scan line includes, for each edge in a first pixel, incrementing a first parameter (sum_fill) by a difference between a right fill style and a left fill style of the edge, wherein the leftmost fill style in the scan line is set to null. The method further includes incrementing a second parameter (fa) by the first parameter of the first pixel and filling a second pixel devoid of edges with a first fill style equal to the second parameter.

DETAILED DESCRIPTION

In accordance with the invention, a graphic engine is provided to render a graphic file for display on a device with limited resources. Such a device may be a cellular phone or a handheld having a slow processor and a small amount of memory. The minimum hardware requirements for the graphic engine depend on the actual screen size. In one embodiment, the minimum hardware requirements for a cellular phone or a handheld include a 50 MHz processor without a floating point coprocessor, 400K of RAM (random access memory), and 100K of hard disk space.

The graphic file to be rendered is typically saved in a vector format such as the Macromedia Flash file format (SWF). The graphic file includes a collection of shapes each defined by a list of edges called a path. The path may contain a mixture of straight edges and curved edges. The straight edge can be defined by a starting point and an end point. The curved edges can be a quadratic Bezier curve defined by two anchor points that are on the path and one control point that is off the path. Each edge can be further defined by two fill styles, one on each side of the edge.

Figure 1:
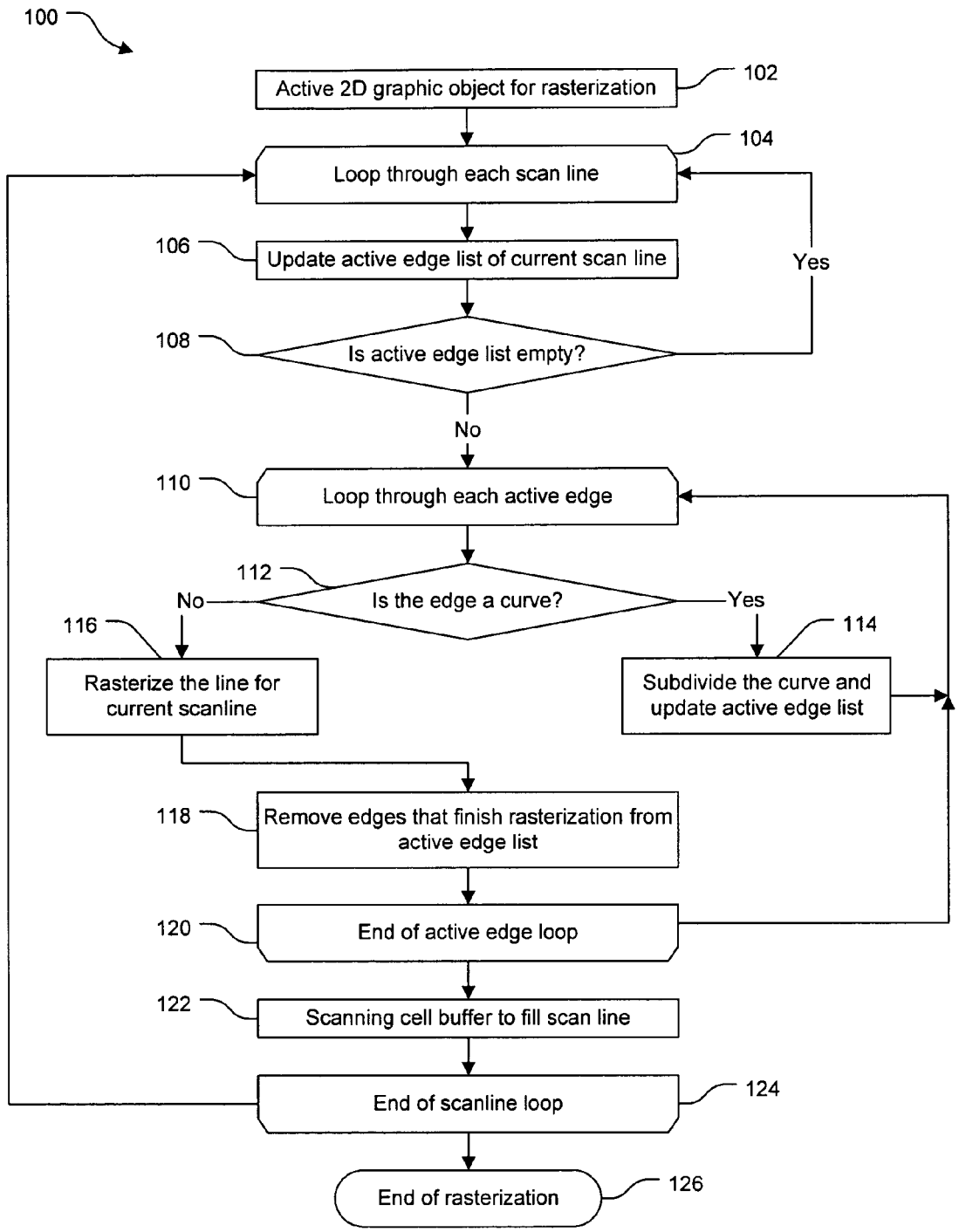
FIG. 1 is a flowchart of a method implemented by a graphic engine for rendering an image file in one embodiment of the invention.

FIG. 1 is a method 100 implemented by a graphic engine for rendering the graphic file in one embodiment of the invention. The graphic engine can be implemented by software, hardware, or a combination thereof. In method 100, the graphic engine uses a fixed point representation call "GFIXED," instead of floating point representation, for geometric points in the graphic file. In the fixed point representation, the graphic engine stores a geometric point using 32 bits including (1) 1 bit for the sign (+/−), (2) 15 bits for decimal digits, and (3) 16 for integer digits. Thus, the integer portion can represent value range [−64K, 64k], and the decimal portion can have the precision of (±1/32K). Typically, the integer portion corresponds to pixel locations and the decimal portion corresponds to sub-pixel locations of the geometric points.

In step 102, the graphic engine activates a 2D graphic object for rasterizing. To active a 2D graphic object, the graphic engine "hangs" each edge (straight or curved) to the topmost horizontal scan line that the edge intersects in a graphic frame. In other words, the graphic engine associates each edge to the topmost horizontal scan line where the edge starts. The graphic engine then organizes the edges into scan line edge lists that each corresponds to one horizontal scan line.

In step 104, the graphic engine starts to loop through each scan line edge list in the graphic frame. Typically, the graphic engine starts with the top scan line edge list.

In step 106, the graphic engine updates an active edge list by adding to it all the edges that appear in the current scan line and removing from it all the edges that ended in the previous scan line. The graphic engine also adds new edges that start in the current scan line by moving the edges in the current scan line edge list to the active edge list. Thus, the active edge list includes all the edges that are to be rasterized.

In step 108, the graphic engine determines if the active edge list is empty. If the active edge list is empty, then there are no edges to be rasterized in the current scan line and step 108 is followed by step 104 where the graphic engine selects the next scan line edge list. Otherwise step 108 is followed by step 110 where the graphic engine starts to rasterize each edge in the active edge list.

In step 110, the graphic engine starts to loop through each active edge in the active edge list. The graphic engine can process the active edges in any order.

In step 112, the graphic engine determines if the current active edge is a curved edge. If the current active edge is a curved edge, then step 112 is followed by step 114. Otherwise step 112 is followed by step 116.

In step 114, the graphic engine approximates the curved edge with straight edges. The graphic engine does this by dividing the curved edge into straight edges and updating the active edge list with the newly created straight edges. One embodiment of step 114 is described later in reference to FIGS. 5 and 6. Step 114 is followed by step 110 where the graphic engine selects the next active edge.

In step 116, the graphic engine rasterizes the current scan line by calculating the projected area of each edge in each pixel of the current scan line. One embodiment of step 116 is described later in reference to FIGS. 2A and 2B.

In step 118, the graphic engine removes the current active edge if it has been completely rasterized for the current scan line.

In step 120, the graphic engine loops back to step 110 if there is another active edge in the active edge list to be rasterized. Otherwise step 120 is followed by step 122.

In step 122, the graphic engine fills pixel cells in a cell buffer with fill style information and then uses the fill style information to fill the corresponding pixels in the current scan line. One embodiment of step 122 is described later in reference to FIG. 8.

In step 124, the graphic engine loops back to step 104 if there is another scan line to be rasterized. Otherwise step 124 is followed by step 126 where the graphic engine ends the rasterization.

Rasterizing A Straight Edge

Figure 2A:
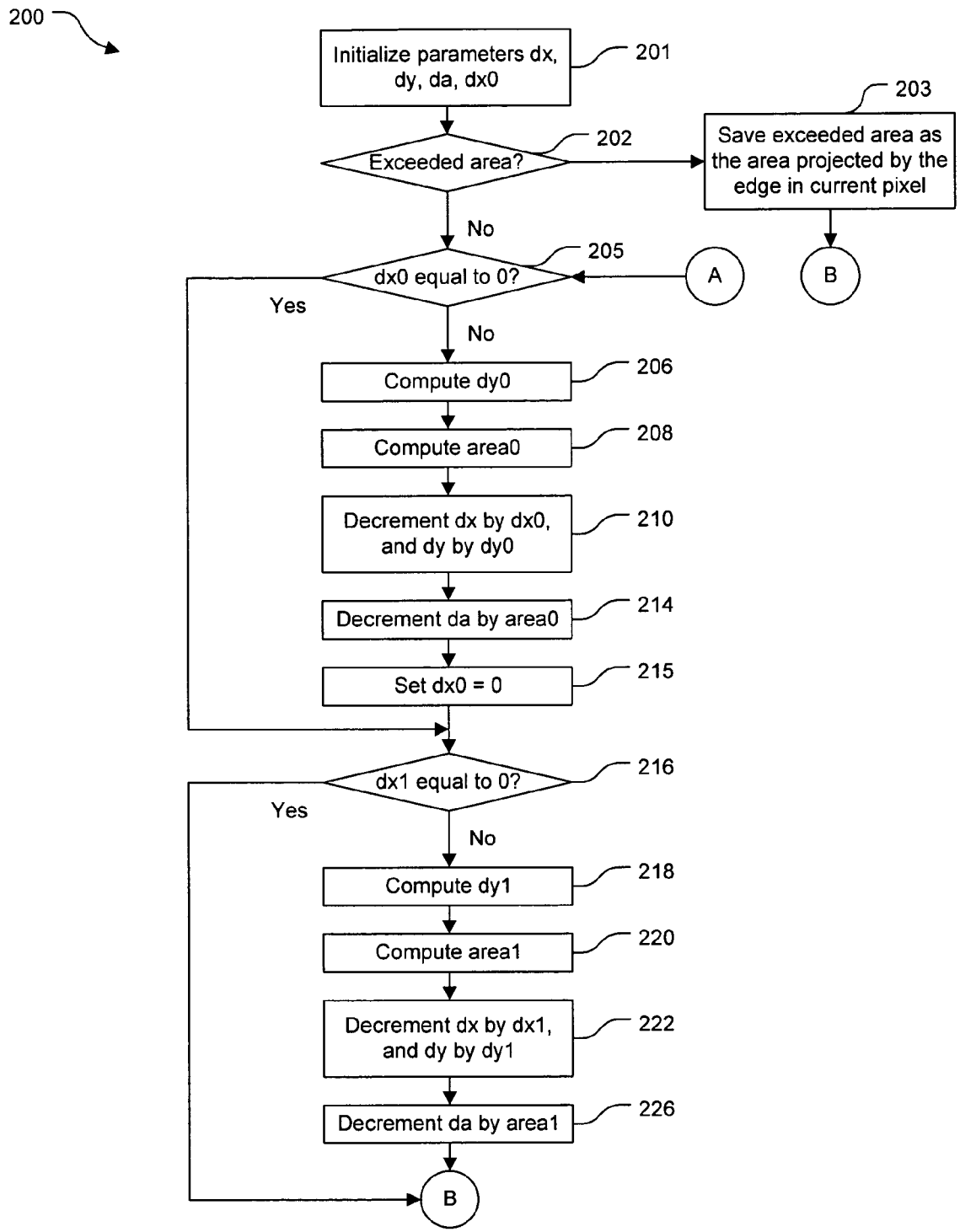
FIGS. 2A and 2B are a flowchart of a method to rasterize an edge in one embodiment of the invention.
Figure 2B:
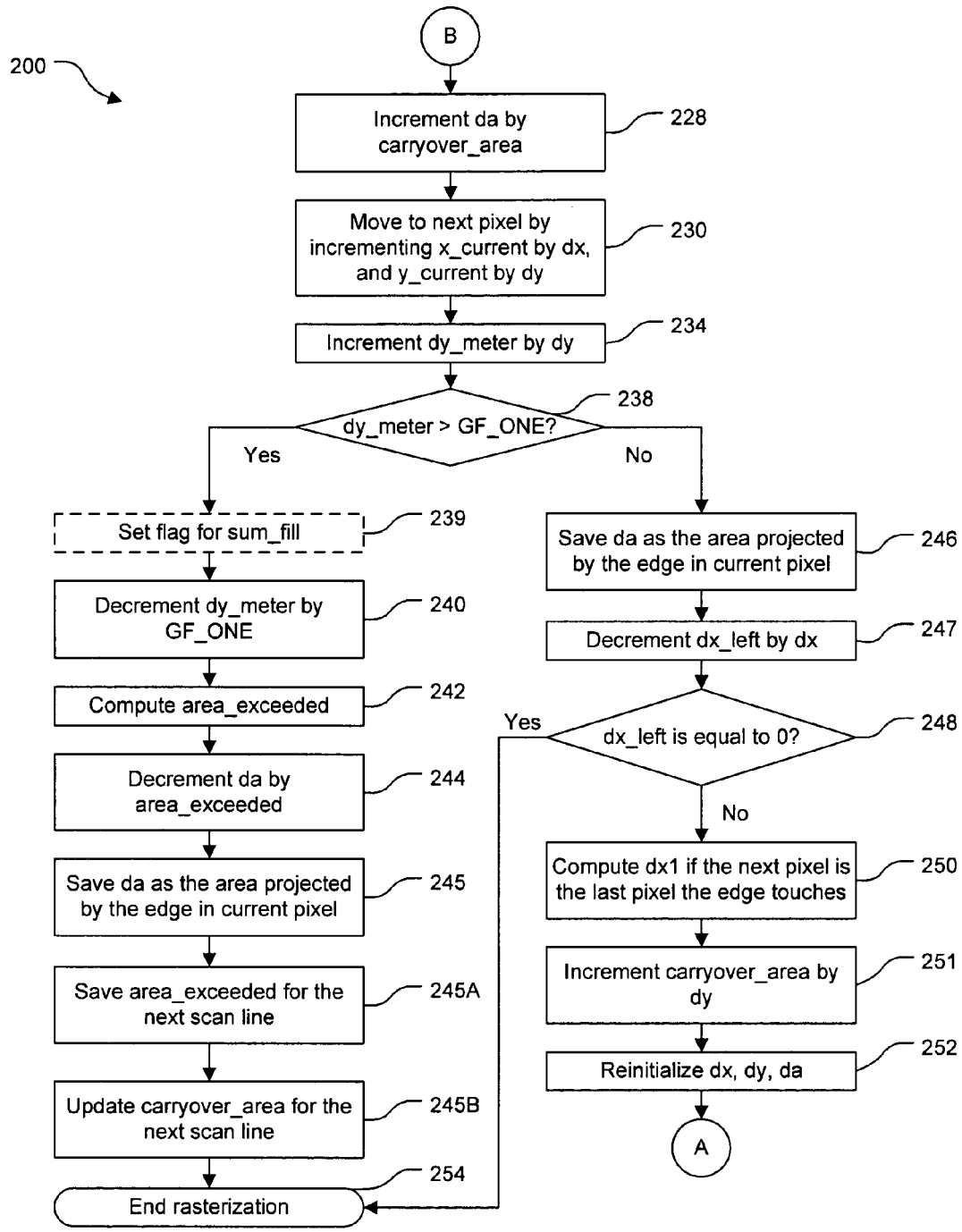

FIGS. 2A and 2B is a flowchart of a method 200 implemented by the graphic engine in step 116 (FIG. 1) to rasterize a straight edge in one embodiment. Specifically, the graphic engine uses method 200 to calculate an area projected by the edge in the pixel it touches. In method 200, the graphic engine only calculates the area projected to the right of the edge while the area projected to the left of the edge is simply the difference between the pixel unit area and the projected area to the right of the edge. Furthermore, each pixel is assumed to have a unit height and width of one, or GF_ONE (i.e., integer one in GFIXED format). In addition, method 200 is implemented for x-major lines but a corresponding method for y-major lines can be similarly implemented by one skilled in the art. At this point, the graphic engine just has the start point and the end point of the edge in the graphic frame.

Figure 3:
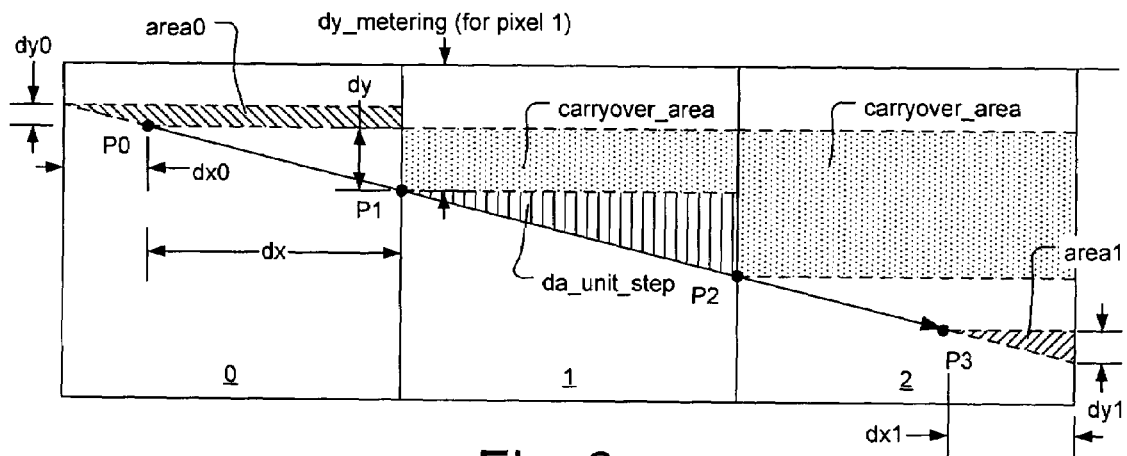
FIGS. 3 and 4 illustrate the application of the method of FIGS. 2A and 2B to rasterize straight edges in one embodiment of the invention.
Figure 4:
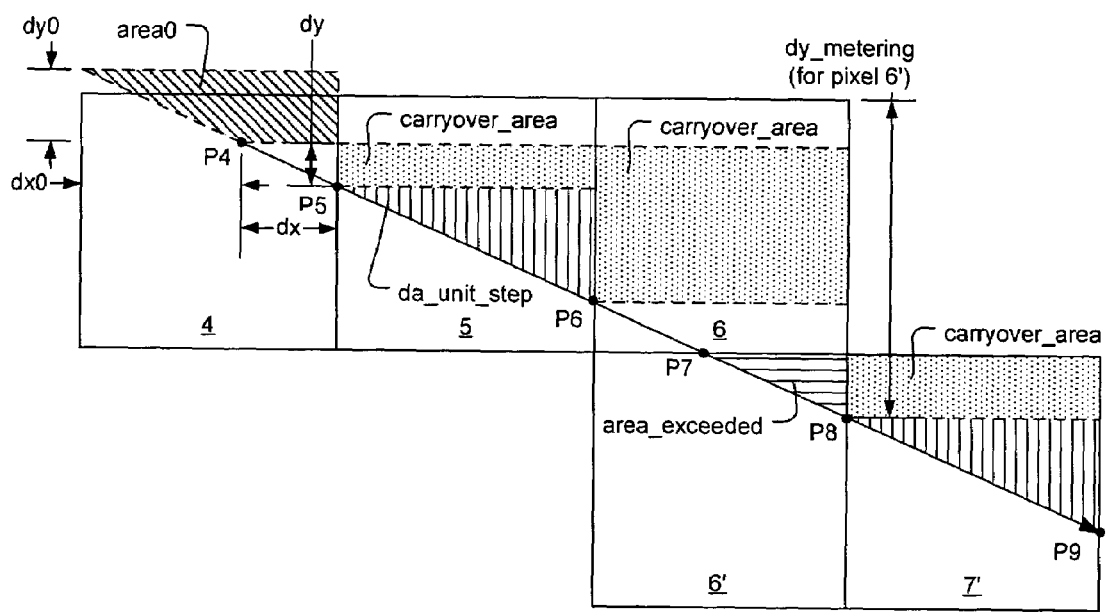

Before the steps of method 200 are described, the definitions of variables used are first illustrated in reference to FIGS. 3 and 4.

x_current—the x coordinate value of a point on an edge being processed (hereafter "current point") (e.g., method 200 will iterate through points P0, P1, P2, P3 in FIG. 3, and points P4, P5, P6, P7, P8, and P9 in FIG. 4).

y_current—the y coordinate value of the current point.

dx0—the distance along the x-direction (i.e., the major direction) from the current point to a corresponding pixel border, wherein the corresponding pixel border is the left pixel border if the edge is traveling to the right, and the corresponding pixel border is the right pixel border if the edge is traveling to the left.

dy0—the distance along the y-direction (i.e., the minor direction) from the current point to a Y-intercept of the edge to the corresponding pixel border.

area0—an excessive area that must be removed from the unit area projected by the edge in the first pixel that the edge touches; a portion of the unit area that begins before the start of the edge.

dx1—the distance along the x-direction from the current point to a corresponding pixel border, wherein the corresponding pixel border is the left pixel border if the edge is traveling to the left, and the corresponding pixel border is the right pixel border if the edge is traveling to the right.

dy1—the distance along the y-direction from the current point to a Y-intercept of the edge to the corresponding pixel border.

area1—an excessive area that must be removed from the unit area projected by the edge in the last pixel that the edge touches (FIG. 3 only); a portion of the unit area that begins after the end of the edge.

dx_unit_step—the unit step across one pixel width in the x-direction.

dx_left—the distance along the x-direction before reaching the end point of an edge (not shown).

dy_metering—the distance along the y-direction used to determine when an edge reaches the next scan line.

dy_step—the travel in the y-direction along an edge across the width of the pixel (not shown).

da_unit_step—the unit area projected by a unit step of an edge across the width of the pixel.

dx—the distance along the x-direction between two adjacent points on an edge.

dy—the distance along the y-direction between two adjacent points on an edge.

area_exceeded—an area projected by an edge that extends from a pixel in one scan line to a pixel in another scan line in one unit step (FIG. 4 only).

da—a variable used to track the area projected to the right of an edge in the pixel.

carryover_area—an area projected onto a pixel by a portion of an edge in a previous pixel in the same scan line.

Method 200 is now described in reference to FIGS. 2A and 2B. In step 201, the graphic engine computes some variables and initializes other variables for the starting point of the edge in the current scan line as follows:

Initialize x_current=x-coordinate of the first point of the edge in the scan line, wherein the current point is the start point of the edge if the edge has not been processed before, or the last point of the edge processed from the previous scan line.

Initialize y_current=y-coordinate of first point.

Compute dx0 from x_current. Parameter dx0 is the fractional value of the x_current if the edge is going right and away from the left pixel border. Parameter dx0 is the difference between the fractional value of x_current and GF_ONE if the edge is going left and away from a right pixel border. Parameter dx0 is only initialized for the first pixel that the edge touches, and once per edge.

Compute dx1 from x_end only if the edge starts and ends within one single pixel. Otherwise dx1 is initialized to be 0.

Initialize dx_left=x_end−x_current, where x_end is the x coordinate of the end point of the edge.

Initialize dy_metering=fraction (y_current), i.e., initialize dy_metering as the fractional part of y_current.

Initialize dy_step=abs (slope), i.e., initialize dy_step as the absolute value of the slope of the edge.

Initialize da_unit_step=abs (slope/2).

Initialize dx=dx_unit_step.

Initialize dy=dy_step.

Initialize da=da_unit_step.

Initialize carryover_area as 0.

Step 201 is followed by step 202.

In step 202, the graphic engine determines if there is an exceeded area from a previous scan line. The exceeded area would have been previously calculated in a step 244 (described later) and saved in a step 245A (described later) in iterations through a previous scan line if the same edge extended into the current scan line in one unit step in the x-direction. If there is an exceeded area from a previously scan line, step 202 is followed by step 203. Otherwise step 202 is followed by step 205.

In step 203, the graphic engine saves the exceeded area (i.e., area_exceeded) as the projected area of edge in the current pixel. Step 203 is followed by step 228.

In step 205, the graphic engine determines if the current point is a starting point of the edge located inside the current pixel (i.e., not on a pixel border). To do so, the graphic engine determines if the current point is on a left border of the current pixel if the edge is traveling to the right, or a right border of the current pixel if the edge is traveling to the left. In these two scenarios, dx0 is equal to 0 and step 205 is followed by step 216. If dx0 is not equal to 0, then the current point is not on either the left or right border of the current pixel and step 205 is followed by step 206.

In step 206, the graphic engine determines the y distance from the current point to a Y-intercept of the edge to the corresponding border in step 205. Specifically, the graphic engine computes dy0. Step 206 is followed by step 208.

In step 208, the graphic engine determines a first area ("area0") that should not be included in the projected area of the edge in the current pixel. The first area is a portion of the unit area that begins prior to the start of the edge.

If dx is greater than zero (i.e., the edge is going from left to right), then the graphic engine calculates area0 as follows:

$$area0 = dy0 - \frac{dx0 \times dy0}{2}. \qquad (1.1)$$

If dx is less than zero (i.e., if the edge is going from right to left), then the graphic engine calculates area0 as follows:

$$area0 = \frac{dx0 \times dy0}{2}. \qquad (1.2)$$

Step 208 is followed by step 210.

In step 210, the graphic engine decrements dx by dx0, and decrements dy by dy0. The graphic engine later uses dx and dy to determine the coordinates of the next point to be processed in method 200. Step 210 is followed by step 214.

In step 214, the graphic engine decrements a unit area projected by the edge in one pixel by area0 to get the actual area projected by the edge in the current pixel. Specifically, the graphic engine decrements da by area0. Step 214 is followed by step 215.

In step 215, the graphic engine sets dx0 equal 0 because the loop through steps 206 to 214 is only performed once for the starting point of an edge that does not begin on a corresponding border of the pixel. Step 215 is followed by step 216.

In step 216, the graphic engine determines if the current point is an end point of the edge located inside the current pixel. To do so, the graphic engine determines if the current point is on a left border of the current pixel if the edge is traveling to the left, or a right border of the current pixel if the edge is traveling to the right. In these two scenarios, dx1 is equal to 0 and step 216 is followed by step 228. If dx1 is not equal to 0, then the current point is not located on either the left or right border of the current pixel and step 216 is followed by step 218. As explained above, dx1 is calculated in step 201 if the edge starts and ends within one single pixel, or in step 250 when the next pixel is the last pixel that the edge touches.

In step 218, the graphic engine determines the y distance from the current point to a Y-intercept of the edge to the corresponding border in step 216. Specifically, the graphic engine computes dy1. Step 218 is followed by step 220.

In step 220, the graphic engine determines a second area ("area1") that should not be included in the projected area of the edge in the current pixel. The second area is a portion of the unit area that begins after the end of the edge.

If dx is greater than zero, then the graphic engine calculates area1 as follows:

$$area1 = \frac{dx1 \times dy1}{2}. \qquad (2.1)$$

If dx is less than zero, then the graphic engine calculates area1 as follows:

$$area1 = dy1 - \frac{dx1 \times dy1}{2}. \qquad (2.2)$$

Step 220 is followed by step 222.

In step 222, the graphic engine decrements dx by dx1, and decrements dy by dy1. The graphic engine later uses dx and dy to determine the coordinates of the next point to be processed in method 200. Step 222 is followed by step 226.

In step 226, the graphic engine decrements the unit area projected by the edge in one pixel by area0 to get the actual area projected by the edge in the current pixel. Specifically, the graphic engine decrements da by area0. Step 226 is followed by step 228.

In step 228, the graphic engine increments the projected area with any carryover area (i.e., carryover_area) from the previous pixel. In each iteration, the carryover area is calculated in a previously iteration at step 251 (described later). Step 228 is followed by step 230.

In step 230, the graphic engine moves along the edge from the current point to the next point that is located on the common border between the current pixel and the next pixel. Specifically, the graphic engine increments x_current by dx, and y_current by dy. Step 230 is followed by step 234.

In step 234, the graphic engine tracks the vertical location of the next point in the scan line so the graphic engine knows if the next point, and thus the edge, has moved into the next scan line. Specifically, the graphic engine increments dy_metering by dy. Step 234 is followed by step 238.

In step 238, the graphic engine determines if the next point has moved into the next scan line. To do so, the graphic engine determines if dy_metering is greater than the height of one pixel, which is GF_ONE. If dy_metering is greater than GF_ONE, then step 238 is followed by an optional step 239 where the graphic engine proceeds to calculate an exceeded area. Otherwise step 238 is followed by step 246.

In optional step 239, the graphic engine sets a flag for the edge in the current pixel that tells the graphic engine to calculate a parameter "sum_fill." Described later in reference to FIGS. 8, 11A, and 11B, the graphic engine uses parameter sum_fill to determine how to fill a pixel that does not include any edges. Step 239 is followed by step 240.

In step 240, the graphic engine determines how much the edge extends into the next scan line. To do so, the graphic engine decrements dy_metering by the height of one pixel, which is GF_ONE. Step 240 is followed by step 242.

In step 242, the graphic engine determines the exceeded area. If dx is greater than zero and dx1 is equal to 0, then the graphic engine computes the exceeded area as follows:

$$\text{area\_exceeded} = \frac{\text{dy\_metering}^2}{2 \times \text{slope}}. \tag{3}$$

If dx is greater than zero but dx1 is not equal to 0, then the graphic engine computes the exceeded area as follows:

$$\text{area\_exceeded} = \frac{\text{dy\_metering}^2}{2 \times \text{slope}} - \text{dy\_metering} \times dx1. \tag{4}$$

If dx is less than zero and dx1 is equal to 0, then the graphic engine computes the exceeded area as follows:

$$\text{area\_exceeded} = \text{dy\_metering} - \frac{\text{dy\_metering}^2}{2 \times \text{slope}}, \text{ or} \tag{5.1}$$

If dx is less than zero but dx1 is not equal to 0, then the graphic engine computes the exceeded area as follows:

$$\text{area\_exceeded} = \text{dy\_metering} - \tag{5.2}$$
$$\frac{\text{dy\_metering}^2}{2 \times \text{slope}} - \text{dy\_metering} \times dx1.$$

The exceeded area is saved in memory for use in the next scan line. Step 242 is followed by step 244.

In step 244, the graphic engine decrements the unit area projected by the edge in one pixel by the exceeded area to get the actual area projected by the edge in the current pixel. Specifically, the graphic engine decrements da by area_exceeded (or area_exceeded' when the edge travels to the left). Step 244 is followed by step 245.

In step 245, the graphic engine saves da as the actual area projected by the edge in the current pixel. Step 245 is followed by step 245A.

In step 245A, the graphic engine saves the exceeded area from step 242 for the next scan line. As previously mentioned in step 202, the exceeded area is used as the projected area of the edge in the pixel that it touches in the next scan line. Step 245A is followed by step 245B.

In step 245B, the graphic engine calculates the carryover area from the exceeded area for an adjacent pixel. If dx is greater than zero, then the carryover area is calculated as follows:

$$\text{carryover\_area} = \text{dy\_metering}. \tag{5.3}$$

If dx is less than zero, then the carryover area is calculated as follows:

$$\text{carryover\_area} = \text{GF\_ONE} - \text{dy\_metering}. \tag{5.4}$$

Step 245B is followed by step 254, which ends method 200.

In step 246, the graphic engine saves da as the actual area projected by the edge in the current pixel. Step 246 is followed by step 247.

In step 247, the graphic engine updates the distance to the end of the edge. Specifically, the graphic engine decrements dx_left by dx. Step 247 is followed by step 248.

In step 248, the graphic engine determines if it has reached the end of the edge. Specifically, the graphic engine determines if dx_left is equal to 0. If so, step 248 is followed by 254, which ends method 200. If dx_left is not equal to 0, then step 248 is followed by step 250.

In step 250, the graphic engine determines dx1 only if the next pixel is the last pixel that the edge touches. The graphic engine knows that the next pixel is the last pixel when dx_left is less than or equal to the width of one pixel (e.g., GF_ONE). Step 250 is followed by step 251.

In step 251, the graphic engine calculates the carryover area for the edge in the next pixel. The graphic engine calculates the carryover area by incrementing the carryover area by dy. The carryover area is used in the next iteration at step 228 to determine the total projected area of the edge in a pixel.

In step 252, the graphic engine reinitializes some of the variables for the next iteration through method 200 for the next point as follows:

Reinitialize dx=dx_unit_step.
Reinitialize dy=dy_step.
Reinitialize da=da_unit_step. Step 252 is followed by step 205 and the method repeats until the edge has been processed for all the pixels it touches.

EXAMPLE 1

To illustrate a scenario where the starting point and the end point of an edge are not located on pixel borders, method 200 is now explained in reference to FIG. 3. The image file provides an edge $\overline{P0P3}$ that has a starting point P0 in pixel 0 and an end point P3 in a pixel 2. Edge $\overline{P0P3}$ intersects the border between pixels 0 and 1 at a point P1, and the border between pixel 1 and 2 at a point P2. Points P1 and P2 are conventionally calculated from points P0 and P3, and the slope of edge $\overline{P0P3}$.

In a first iteration through method 200, the graphic engine processes the portion of edge $\overline{P0P3}$ in pixel 0. In step 201, the graphic engine computes and initializes the variables for point P0. Most notably, the graphic engine computes dx0. As the edge does not start and end within one pixel, dx1 is initialized as 0. In step 202, the graphic engine determines there is no exceeded area from rasterizing a previous scan line because edge $\overline{P0P3}$ starts in the current scan line. Thus, step 202 is followed by step 205. In step 205, the graphic engine determines that dx0 does not equal to 0 because point P0 is not located on the left border of pixel 0. Thus, step 205 is followed by step 206. In step 206, the graphic engine computes dy0 for point P0. In step 208, the graphic engine computes area0 from dy0. In step 210, the graphic engine decrements dx by dx0, and dy by dy0. In step 214, the graphic engine decrements da by area0, which is not part of the area projected by edge $\overline{P0P3}$ in pixel 0. In step 215, the graphic engine sets dx0 equal to 0.

In step 216, the graphic engine determines that dx1 is equal to 0 because point P0 is not an end point located inside pixel 0. Thus, step 216 is followed by step 228. In step 228, the graphic engine increments da by the carryover area, which was initialized to 0. In step 230, the graphic engine increments x_current by dx, and y_current by dy, to advance from point P0 in pixel 0 to point P1 in pixel 1. In step 234, the graphic engine increments dy_metering by dy to track when edge $\overline{P0P3}$ reaches the next scan line.

In step 238, the graphic engine determines that dy_metering is less than GF_ONE because edge $\overline{P0P3}$ is still in the current scan line. Thus, step 238 is followed by step 246. In step 246, the graphic engine saves the value of da as the area projected by edge $\overline{P0P3}$ in pixel 0. In step 247, the graphic engine decrements dx_left by dx to track when the end of edge $\overline{P0P3}$ will be reached. In step 248, the graphic engine determines that dx_left is not equal to 0 because it has not reached the end of edge $\overline{P0P3}$. Thus, step 248 is followed by step 250. In step 250, the graphic engine does not calculate dx1 because the next pixel (pixel 1) is not the last pixel that edge $\overline{P0P3}$ touches. In step 251, the graphic engine increments the carryover area, which was initialized to 0, by dy. In step 252, the graphic engine reinitializes dx, dy, and da. Step 252 is followed by step 205 and the methods repeats for point P1 in pixel 1.

In a second iteration through method 200, the graphic engine processes point P1 in pixel 1. In step 205, the graphic engine determines that dx0 is set to 0. Thus, step 205 is followed by step 216. In step 216, the graphic engine determines that dx1 is equal to 0 because point P1 is not an end point located inside pixel 1. Thus, step 216 is followed by step 228. In step 228, the graphic engine increments da by the carryover area calculated in the previous iteration at step 251. In step 230, the graphic engine increments x_current by dx, and y_current by dy, to advance from point P1 in pixel 1 to point P2 in pixel 2. In step 234, the graphic engine increments dy_metering by dy to track when edge $\overline{P0P3}$ reaches the next scan line.

In step 238, the graphic engine determines that dy_metering is less than GF_ONE because edge $\overline{P0P3}$ is still in the current scan line. Thus, step 238 is followed by step 246. In step 246, the graphic engine saves the value of da as the projected area by edge $\overline{P0P3}$ in pixel 1. In step 247, the graphic engine decrements dx_left by dx to track when the end of edge $\overline{P0P3}$ will be reached. In step 248, the graphic engine determines that dx_left is not equal to 0 because it has not reached the end of edge $\overline{P0P3}$. Thus, step 248 is followed by step 250. In step 250, the graphic engine calculates dx1 because the next pixel (pixel 2) is the last pixel that edge $\overline{P0P3}$ touches. In step 251, the graphic engine increments the carryover area by dy. In step 252, the graphic engine reinitializes dx, dy, and da. Step 252 is followed by step 205 and the methods repeats for point P2 in pixel 2.

In a third iteration through method 200, the graphic engine processes point P2 in pixel 2. In step 205, the graphic engine determines that dx0 is set to 0. Thus, step 205 is followed by step 216. In step 216, the graphic engine determines that dx1 is not equal to 0 because point P2 is an end point located inside pixel 2. Thus, step 216 is followed by step 218.

In step 218, the graphic engine determines dy1 for point P2. In step 220, the graphic engine determines area1 from dy1. In step 222, the graphic engine decrements dx by dx1, and dy by dy1. In step 226, the graphic engine decrements da by area1, which is not an area projected by edge $\overline{P0P3}$ in pixel 2.

In step 228, the graphic engine increments da by the carryover area calculated in the previous iteration at step 251. In step 230, the graphic engine increments x_current by dx, and y_current by dy, to advance from point P2 in pixel 2 to point P3 in pixel 2. In step 234, the graphic engine increments dy_metering by dy to track when edge $\overline{P0P3}$ reaches the next scan line.

In step 238, the graphic engine determines that dy_metering is less than GF_ONE because edge $\overline{P0P3}$ is still in the current scan line. Thus, step 238 is followed by step 246. In step 246, the graphic engine saves the value of da as the projected area by edge $\overline{P0P3}$ in pixel 2. In step 247, the graphic engine decrements dx_left by dx to track when the end of edge $\overline{P0P3}$ will be reached. In step 248, the graphic engine determines that dx_left is equal to 0 because it has reached the end of edge $\overline{P0P3}$. Thus, step 248 is followed by step 254, which ends method 200.

EXAMPLE 2

To illustrate a scenario when an edge extends into the next scan line in one unit step, method 200 is now explained in reference to FIG. 4. FIG. 4 shows an edge $\overline{P4P9}$ having a starting point P4 in a pixel 4 and an end point P9 in a pixel 7'. Edge $\overline{P4P9}$ intersects the border between pixels 4 and 5 at a point P5, the border between pixels 5 and 6 at a point P6, and the border between pixels 6 and 6' at a point P7. Points P5, P6, and P7 are conventionally calculated from points P4 and P8, and the slope of edge $\overline{P4P9}$.

In a first iteration through method 200, the graphic engine starts with the portion of edge $\overline{P4P9}$ in pixel 4. In step 201, the graphic engine computes and initializes the parameters for point P4. Most notably, the graphic engine computes dx0. As the edge does not start and end in one pixel, dx1 is initialized as 0. In step 202, the graphic engine determines there is no exceeded area from rasterizing a previous scan line and proceeds to step 205. In step 205, the graphic engine determines that dx0 does not equal to 0 because point P4 is not located on the left border of pixel 0. Thus, step 205 is followed by step 206. In step 206, the graphic engine determines dy0 for point P4. In step 208, the graphic engine determines area0 from dy0. In step 210, the graphic engine decrements dx by dx0, and dy by dy0. In step 214, the graphic engine decrements da by area0, which is not an area projected by edge $\overline{P4P9}$ in pixel 4.

In step 216, the graphic engine determines that dx1 of point P4 is equal to 0 because point P4 is not an end point located inside pixel 4. Thus, step 216 is followed by step 228. In step 228, the graphic engine increments da by the carryover area, which was initialized as 0. In step 230, the graphic engine increments x_current by dx, and y_current by dy, to advance from point P4 in pixel 4 to point P5 in pixel 5. In step 234, the graphic engine increments dy_metering by dy to track when edge $\overline{P4P9}$ reaches the next scan line.

In step 238, the graphic engine determines that dy_metering is less than GF_ONE and proceeds to step 246. In step 246, the graphic engine saves the value of da as the area projected by edge $\overline{P4P9}$ in pixel 4. In step 247, the graphic engine decrements dx_left by dx to track when it reaches the end of edge $\overline{P4P9}$. In step 248, the graphic engine determines that dx_left is not equal to 0 and proceeds to step 250. In step 250, the graphic engine does not calculate dx1 because the next pixel (pixel 5) is not the last pixel that edge $\overline{P4P9}$ touches. In step 251, the graphic engine increments the carryover area, which was initialized to 0, by dy. In step 252, the graphic engine reinitializes dx, dy, and da. Step 252 is followed by step 205 and the methods repeats for point P5 in pixel 5.

The second iteration through method 200 for point P5 in pixel 5 is straight forward and is not explained.

In a third iteration through method 200, the graphic engine processes point P6 in pixel 6. In step 205, the graphic engine determines that d 216, the graphic engine determines that dx1 of point P6 is equal to 0 because point 6 is not an end point located inside pixel 6. Thus, step 216 is followed by step 228. In step 228, the graphic engine computes increments da by the carryover area calculated in the previous iteration. In step 230, the graphic engine increments x_current by dx and y_current by dy to advance from point P6 to point P8. In step 234, the graphic engine increments dy_metering by dy to track when edge $\overline{P4P9}$ reaches the next scan line.

In step 238, the graphic engine determines that dy_metering is greater than GF_ONE because edge $\overline{P4P9}$ extends into the next scan line in one unit step. Thus, step 238 is followed by optional step 239. In optional step 239, the graphic engine sets the flag for parameter sum_fill. In step 240, the graphic engine decrements dy_metering by GF_ONE. In step 242, the graphic engine computes the exceeded area in pixel 6' from dy_metering. In step 244, the graphic engine decrements da by the exceeded area, which is not part of the area projected by edge $\overline{P4P9}$ in pixel 6. In step 245, the graphic engine saves da as the area projected by edge $\overline{P4P9}$ in pixel 6. In step 245A, the graphic engine saves the exceeded area of edge $\overline{P4P9}$ in pixel 6' so it can be used when the graphic engine processes edge $\overline{P4P9}$ in the next scan line. In step 245B, the graphic engine saves the carryover area projected onto a pixel 7' by the exceeded area in pixel 6', which is simply dy_metering. Step 245B is followed by step 254, which ends method 200.

Approximating A Quadratic Bezier Curve

Figure 5:
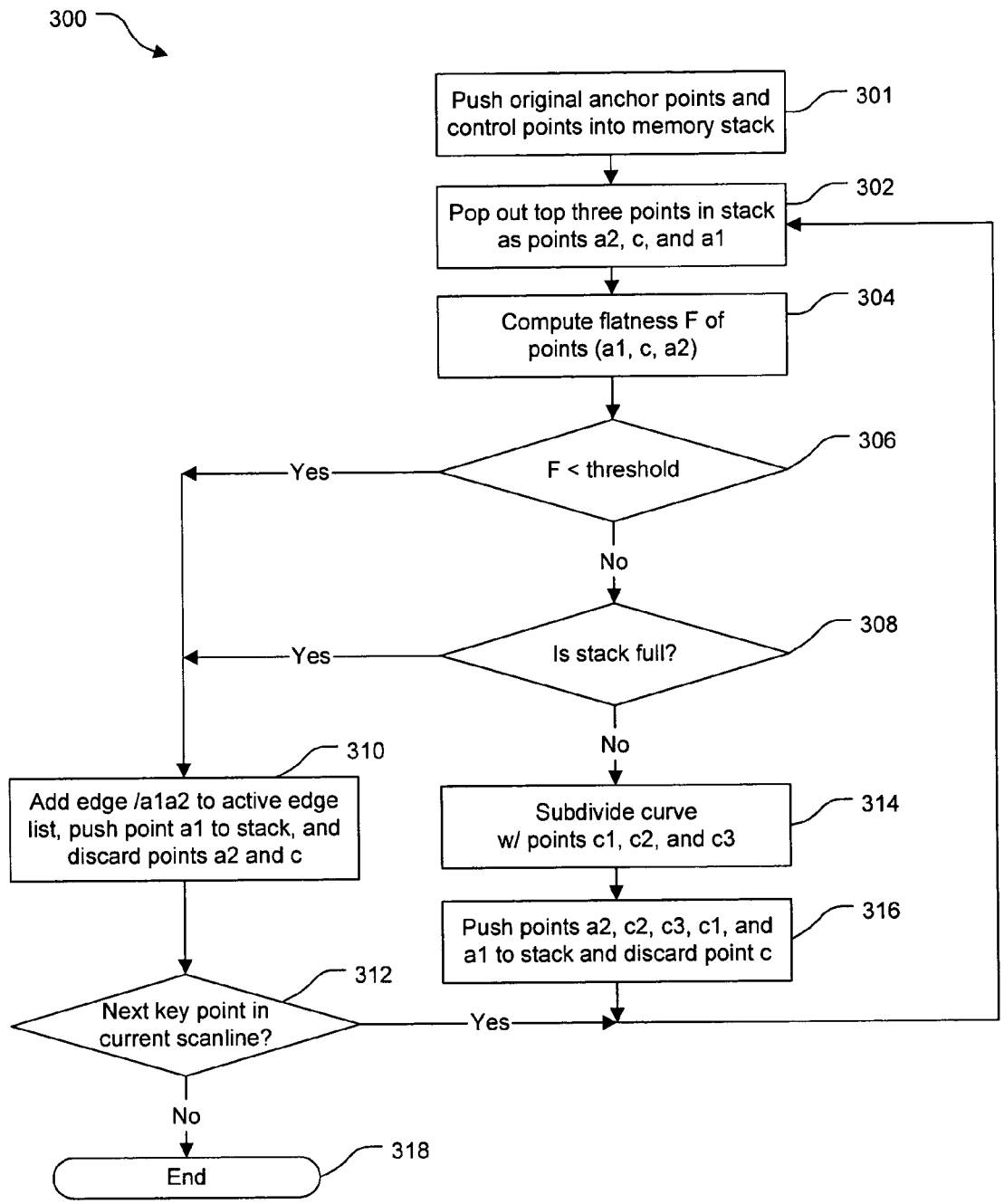
FIG. 5 is a flowchart of a method used to approximate a curved edge with straight edges in one embodiment of the invention.
Figure 7A:
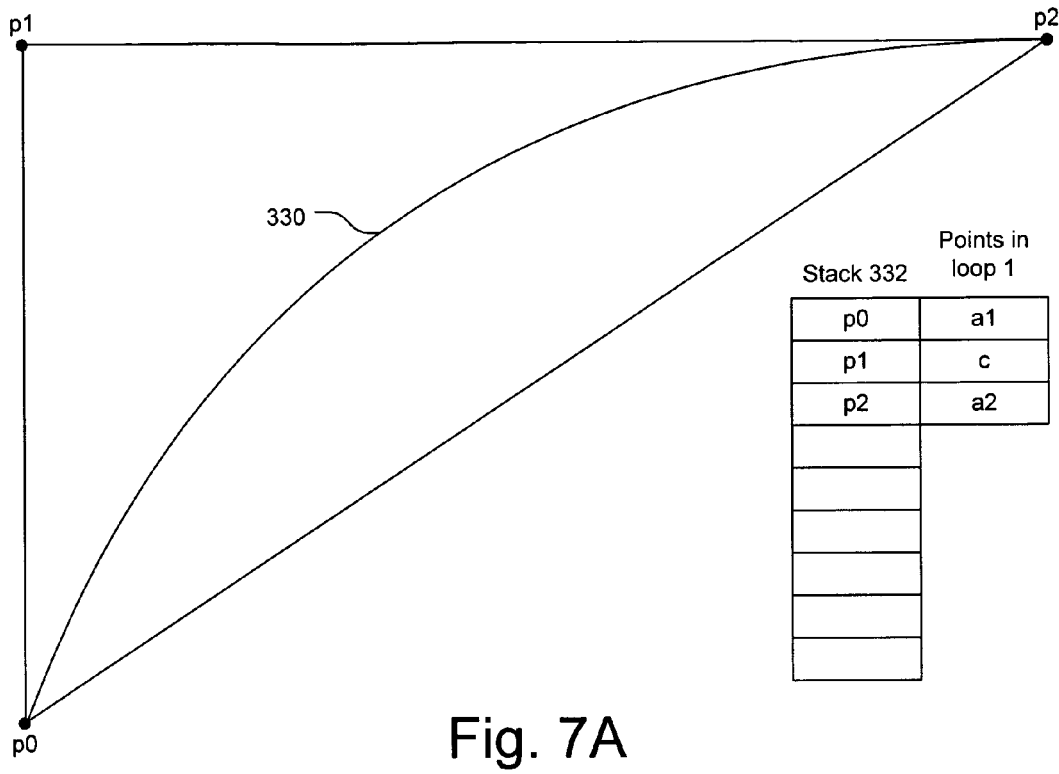
FIGS. 7A, 7B, 7C, and 7D illustrate the application of the method of FIG. 5 to a curved edge in one embodiment of the invention.

FIG. 5 is a flowchart of a method 300 implemented by the graphic engine in step 114 (FIG. 1) to approximate a curved edge in one embodiment. Specifically, the graphic engine uses method 300 to divide quadratic Bezier curved edge into straight edges. The quadratic Bezier curved edge is represented by two original anchor points (e.g., p0 and p2 in FIG. 7A) that are on the edge and an original control point (e.g., point p1 in FIG. 7A) located off the edge. To optimize performance, graphic engine uses method 300 to approximate only y-monotone curved edges.

In step 301, the graphic engine pushes (i.e., puts) the two original anchor points and the original control point into an allocated memory stack. As the graphic engine is part of a resource-limited device, the memory stack allocated for method 300 can be small. For example, the memory stack may have a depth of 9 and take up a total of 36 bytes. If the graphic engine is rendering horizontal scan line from top to bottom, the lower anchor point is first put into the memory stack, followed by the control point, and then the upper anchor point. Step 301 is followed by step 302.

In step 302, the graphic engine pops out (i.e., removes) the top three points from the memory stack 332 as variables/points a1, c, and a2, where a1 is a lower anchor point, c is the control point, and a2 is an upper anchor point. In a first pass through method 300, the graphic engine would remove the two original anchor points and the original control point. In subsequent passes when the curved edge is divided by additional points, the graphic engine would remove the top three points in the memory stack, which include two anchor points and a control point. This allows method 300 to process the curved edge in a depth-first manner. Step 302 is followed by step 304.

In step 304, the graphic engine computes a flatness F of a triangle formed by the top three points a1, c, and a2 as follows:

$$F(a1,c,a2)=S(a1,c,a2)/|a1a2|, \quad (6)$$

where S (a1, c, a2) is the area of a triangle formed by points a1, c, and a2, and |a1a2| is the distance between anchor points a1 and a2. For a quadratic Bezier curve, S (a1, c, a2) of the original anchor and control points is calculated as follows:

$$S(p0,p1,p2)=Abs((x2-x1)\times(y1-y0)-(x1-x0)\times(y2-y1)), \quad (7.1)$$

where (x0, y0) and (x2, y2) are the coordinates of the original anchor points p0 and p2, respectively, and (x1, y1) are the coordinates of the original control point p1. Subsequently, any triangle formed by dividing an original triangle is calculated as follows:

$$S(divided)=S(original)/8. \quad (7.2)$$

Thus, the area of any divided triangle can be easily calculated. Step 304 is followed by step 306.

In step 306, the graphic engine determines if flatness F is less than a threshold. The threshold is selected so the straight edges that replace the curved edge would appear smooth when rasterized. If flatness F is less than the threshold, then step 306 is followed by step 310. Otherwise step 306 is followed by step 308.

In step 308, the graphic engine determines if the allocated memory stack is full. If the memory stack is full, then step 308 is followed by step 310 because the graphic engine has run out of memory to perform further subdivision of the curved edge. If the memory stack is not full, step 308 is followed by step 314 where the graphic engine divides the curved edge.

In step 310, the graphic engine replaces part of the curved edge with a straight edge between anchor points a1 and a2. The graphic engine does this by adding the straight edge to the active edge list. The graphic engine also discards anchor point a2 and control point c, and pushes points a1 back into the memory stack. Step 310 is followed by step 312.

In step 312, the graphic engine determines if the topmost point in the memory stack is located in the current scan line. If so, step 312 is followed by step 302 and method 300 repeats until the curved edge has been replaced by straight edges in the current scan line. If the topmost point in the memory stack is not located in the current scan line, then method 200 ends in step 318.

In step 314, the graphic engine divides the curved edge with points c1, c2, and c3 as follows:

$$c1=(a1+c)/2; \quad (8)$$

$$c2=(a2+c)/2; \text{ and} \quad (9)$$

$$c3=(c1+c2)/2. \quad (10)$$

Thus, the graphic engine forms new anchor points c1 and c2 (e.g., intermediate control points), and new control point c3 (e.g., intermediate control point). Anchor point c1 is the midpoint of a line between points a1 and c, anchor point c2 is the midpoint between points a2 and c, and control point c3 is the midpoint between points c1 and c2. Step 314 is followed by step 316.

In step 316, the graphic engine pushes points a2, c2, c3, c1, and a1 into the memory stack, and discards point c. Step 316 is followed by step 302 and method 300 repeats until the curved edge has been replaced by straight edges in the current scan line.

EXAMPLES DEMONSTRATING METHOD 300

Method 300 is now explained in reference to FIG. 7A to 7D. In a first loop through method 300 that begins in step 301, the graphic engine receives the original anchor points p0 and p2, and the original control point p1 that define a curved edge 330 in FIG. 7A. The graphic engine pushes these points into a memory stack 332. In step 302, the graphic engine pops out the top three points (i.e., p2, p1, and p0 in FIG. 7A) as points a2, c, and a1. In step 304, the graphic engine computes the flatness F of the triangle formed by points a2, c, and a1. In step 306, the graphic engine determines that the flatness F is greater than the threshold and proceeds to step 308. In step 308, the graphic engine determines that memory stack 332 is not full and proceeds to step 314. If memory stack 332 is ever full, then step 308 is followed by steps 310 and 312 as described later in a fourth loop.

Figure 7B:
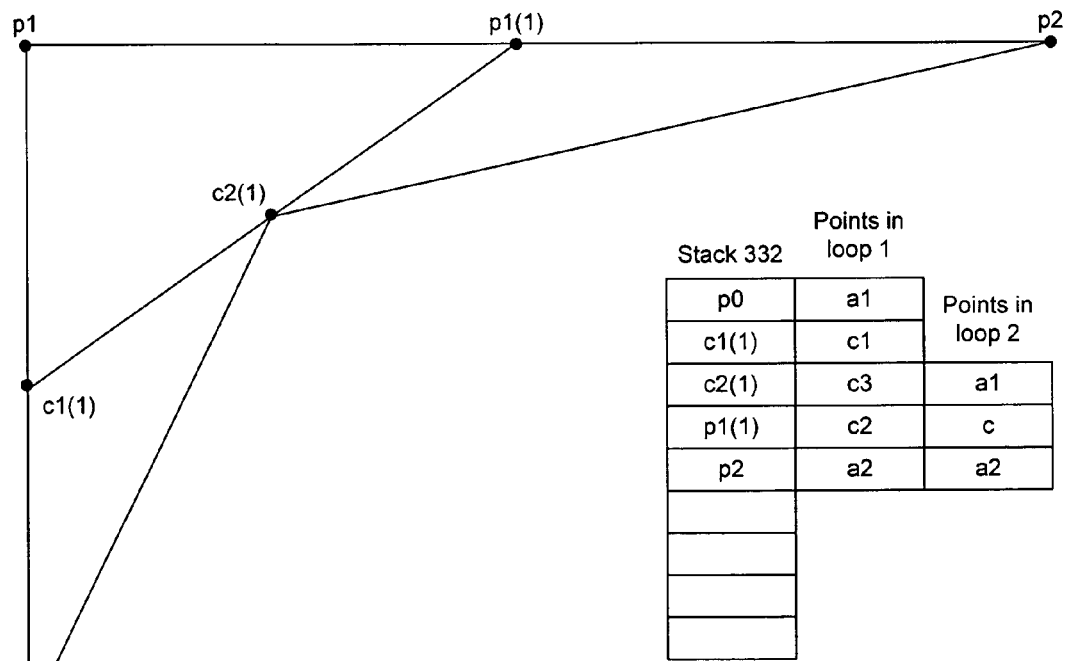

In step 314, the graphic engine divides curved edge 330 with points c1, c3, and c2 (i.e., points c1(1), c2(1), and p1(1) in FIG. 7B). In step 316, the graphic engine pushes points a2, c2, c3, c1, and a1 (i.e., points p2, p1(1), c2(1), c1(1), and p0 in FIG. 7B) into memory stack 332. Note that point c (i.e., point p1 in FIGS. 7A and 7B) is discarded. Step 316 is followed by step 302 for a second loop through method 300.

In a second loop through method 300 that begins in step 302, the graphic engine pops out the top three points (i.e., p2, p1(1), and c2(1) in FIG. 7B) as points a2, c, and a1. In step 304, the graphic engine computes the flatness F of the triangle formed by points a2, c, and a1. In step 306, the graphic engine determines that the flatness F is greater than the threshold and proceeds to step 308. In step 308, the graphic engine determines that memory stack 332 is not full and proceeds to step 314. If memory stack 332 is ever full, then step 308 is followed by steps 310 and 312 as described later in a fourth loop.

Figure 7C:
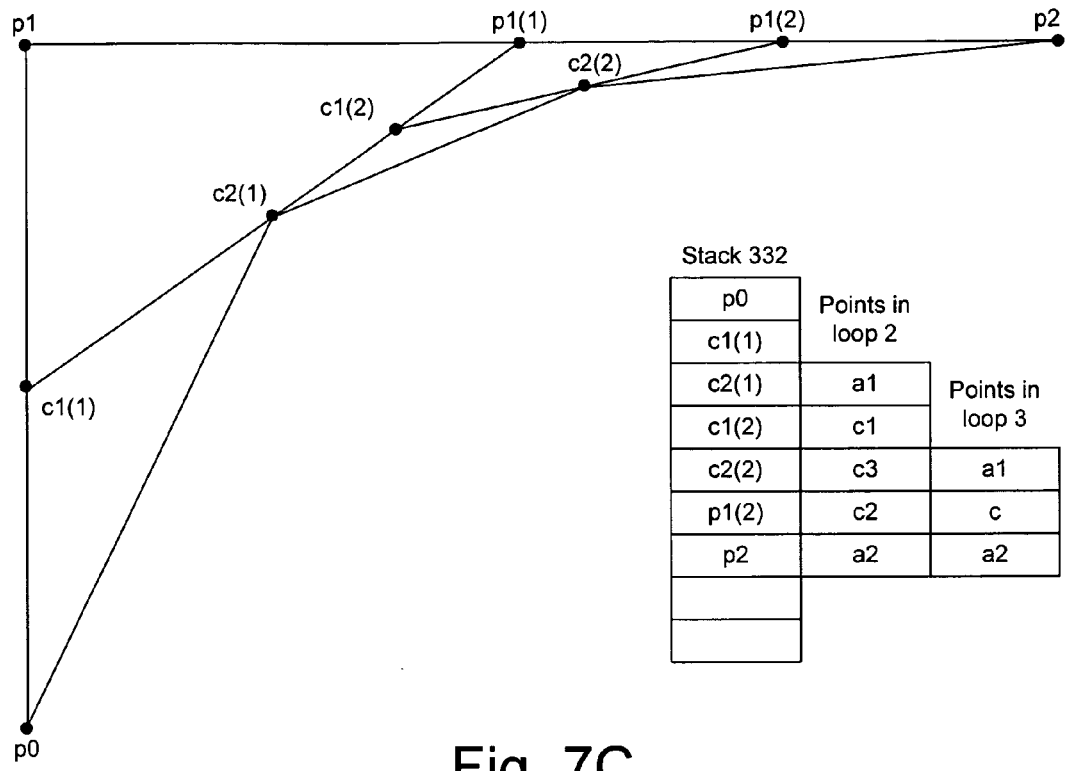

In step 314, the graphic engine divides curved edge 330 with points c1, c3, and c2 (i.e., points c1(2), c2(2), and p1(2) in FIG. 7C). In step 316, the graphic engine pushes points a2, c2, c3, c1, and a1 (i.e., points p2, p1(2), c2(2), c1(2), and c2(1) in FIG. 7C) into memory stack 332. Note that point c (i.e., point p1(1) in FIGS. 7B and 7C) is discarded. Step 316 is followed by step 302 for a third loop through method 300.

In a third loop through method 300 that begins in step 302, the graphic engine pops out the top three points (i.e., points p2, p1(2), and c2(2) in FIG. 7C) as points a2, c, and a1. In step 304, the graphic engine computes the flatness F of the triangle formed by points a2, c, and a1. In step 306, the graphic engine determines that the flatness F is greater than the threshold and proceeds to step 308. In step 308, the graphic engine determines that memory stack 332 is not full and proceeds to step 314. If memory stack 332 is ever full, then step 308 is followed by steps 310 and 312 as described later in a fourth loop.

In step 314, the graphic engine divides curved edge 330 with points c1, c3, and c2 (i.e., c1(3), c2(3), and p1(3) in FIG. 7C). In step 316, the graphic engine pushes points a2, c2, c3, c1, and a1 (i.e., points p2, p1(3), c2(3), c1(3), and c2(2) in FIG. 7D) into memory stack 332. Note that point c (i.e., p1(2) in FIGS. 7C and 7D) is discarded. Step 316 is followed by step 302 for a fourth loop through method 300.

Figure 7D:
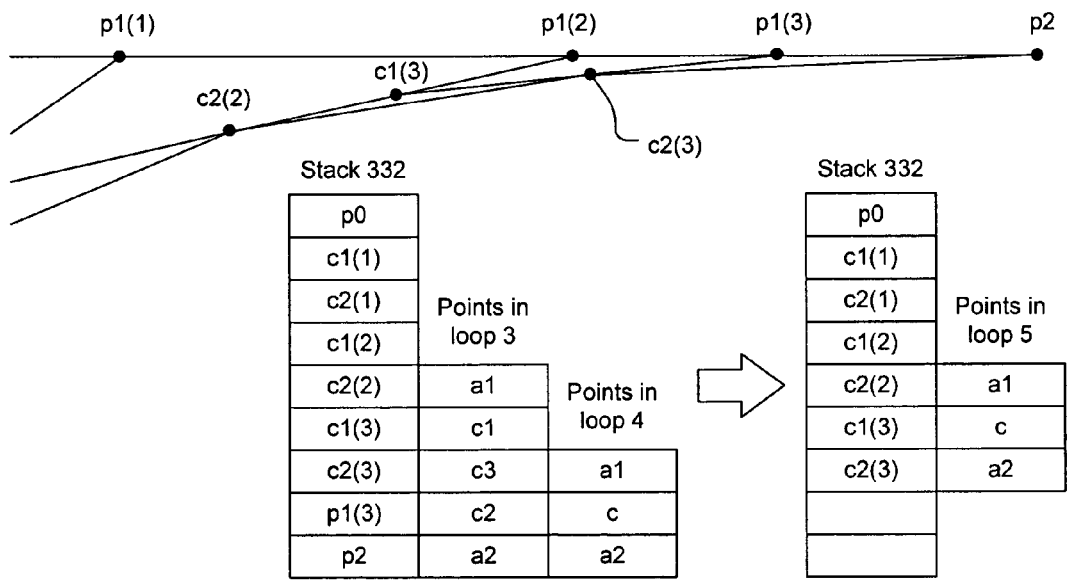

In a fourth loop through method 300 that begins in step 302, the graphic engine pops out the top three points (i.e., p2, p1(3), and c2(3) in FIG. 7D) as points a2, c, and a1. In step 304, the graphic engine computes the flatness F of the triangle formed by points a2, c, and a1. In step 306, the graphic engine determines that the flatness F is less than a threshold and proceeds to step 310.

In step 310, the graphic engine adds an edge between anchor points a2 and a1 (i.e., points p2 and c2(3) in FIG. 7D) to the active edge list. The graphic engine also pushes back point a1 (i.e., point c2(3) in FIG. 7D) into memory stack and discards the top anchor point a2 and control point c (i.e., anchor point p2 and control point p1(3) in FIG. 7D). In step 312, the graphic engine determines if the next top anchor point is in the current scan line. In this example, the next top anchor point (i.e., point c2(3) in FIG. 7D) is assumed to be in the current scan line so step 312 is followed by step 302 for another loop through method 300.

Dividing Curved Edges Into Y-monotone Curves

Figure 6:
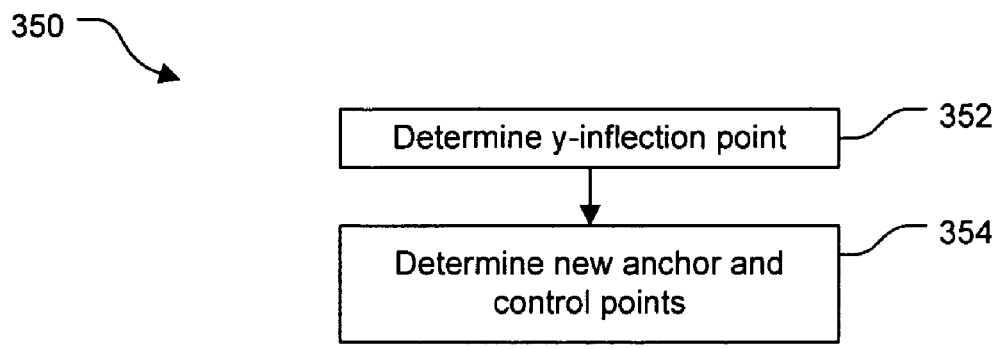
FIG. 6 is a flowchart of a method to split a curved edge with a y-inflection into two y-monotone curved edges in one embodiment of the invention.
Figure 6A:
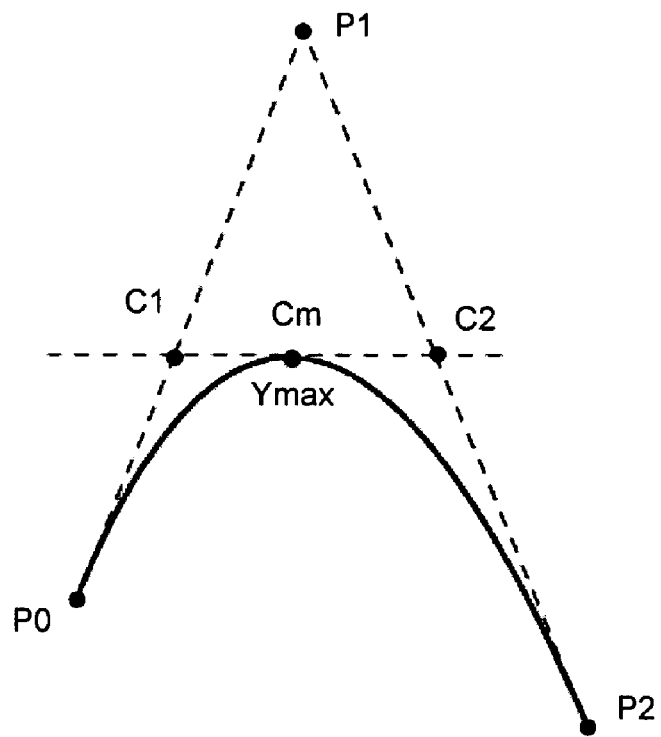
FIG. 6A illustrates a curved edge that is divided into two monotone curved edges in one embodiment of the invention.

As described above, method 300 is used to divide a y-monotone curved edge into straight edges. Thus, a curved edge having a y-inflection point (either a maximum or a minimum) must be first divided into two y-monotone curved edges. FIG. 6 illustrates a method 350 for dividing a curved edge 380 (FIG. 6A) into two monotone curved edges.

In step 352, the graphic engine determines the y-inflection point. A Bezier curve can be represented by a parameter t using the following formula:

$$P(t)=P_0(1-t)^2+2(1-t)tP_1+t^2P_2, \quad (11)$$

where $P_0$ is an anchor point, $P_1$ is a control point, and $P_2$ is another anchor point. The derivative of equation (11) is:

$$P'_y(t)=(y_1-y_0)(1-t)+(y_2-y_1)t \quad (12)$$

where y0, y1, and y2 are the y-coordinates of points $P_0$, $P_1$, and $P_2$. Equation (12) is equal to 0 at the y-inflection point. Thus, parameter t at the y-inflection point becomes:

$$t=(y_0-y_1)/(y_2-2y_1+y_0). \quad (13)$$

In step 354, the graphic engine determines a new control point $C_1$, a new anchor point $C_m$, and a new control point $C_2$ as follows:

$$C_1=(1-t)P_0+tP_1, \quad (14)$$

$$C_2=(1-t)P_1+tP_2, \text{ and} \quad (15)$$

$$C_m=(1-t)C_1+tC_2. \quad (16)$$

Anchor point $P_0$, control point $C_1$, and anchor point $C_m$ form a first monotone curved edge, and anchor point $C_m$, control point $C_2$, and anchor point $P_2$ form a second monotone curved edge. These monotone curved edges are then replaced with straight edges using method 300 described above.

Handling Sub-Pixel Regions

Figure 8:
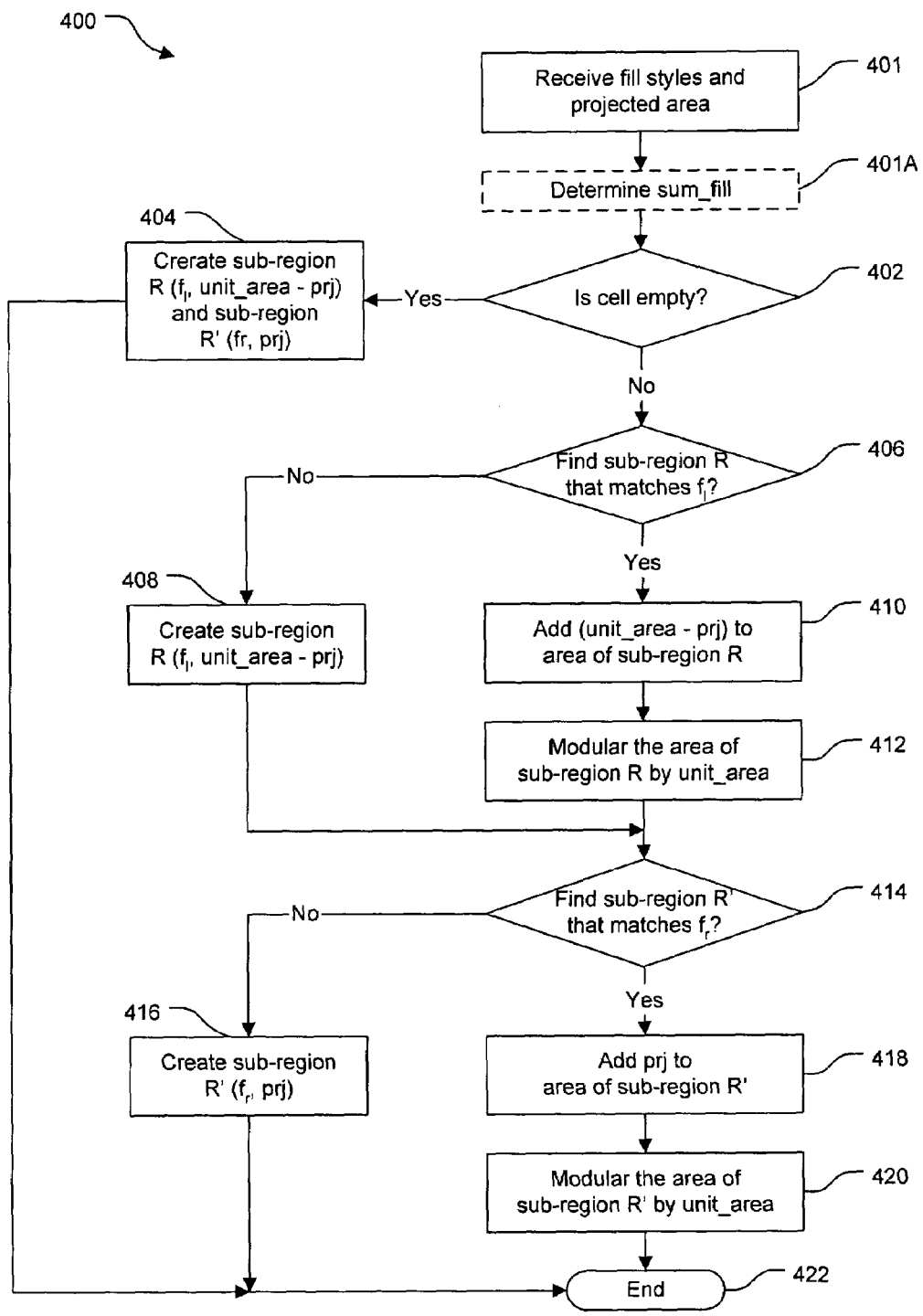
FIG. 8 is a flowchart of a method to handle sub-pixel regions created by edges in a pixel in one embodiment of the invention.

FIG. 8 is a flowchart of a method 400 implemented by the graphic engine in step 122 (FIG. 1) to handle sub-pixel regions formed by straight edges in a pixel in one embodiment. Method 400 is performed for each edge in a pixel. Specifically, the graphic engine uses method 400 to calculate the area of each sub-pixel region in a pixel. The graphic engine saves the area and the fill style of each sub-pixel region in a pixel cell corresponding to the pixel, wherein a number of the pixel cells make up a scan line cell buffer (e.g., a cell buffer 630 in FIG. 12). Method 400 is further repeated for each pixel in a scan line to fill the scan line cell buffers. The sub-pixel region areas are used by other algorithms to produce anti-alias lines and anti-alias fills. Please note that method 400 is able to process the edges in any order regardless of their geometric relationship. Furthermore, method 400 does not calculate any information related to the geometric relationship of the sub-regions and the edges (i.e., calculate what is an interior region and what is an exterior region), which is very processor and memory intensive.

In step 401, the graphic engine receives a left fill style $f_l$, a right fill style $f_r$ of the edge, and a projected area prj determined from method 200 (FIGS. 2A and 2B) for an edge that touches the current pixel. Step 401 is followed by optional step 401A.

In optional step 401A, the graphic engine determines the parameter sum_fill for the current pixel in response to the sum_fill flag (set in step 239 in FIG. 2B), the left fill style, and the right fill style. Optional step 401A is later described in reference to FIG. 11A. Optional step 401A is followed by step 402.

In step 402, the graphic engine determines if the pixel is empty. The pixel is empty if there are no sub-pixel regions created by another edge in the pixel. If the pixel is empty, then step 402 is followed by step 404. Otherwise step 402 is followed by step 406.

In step 404, the graphic engine creates a first sub-pixel region R having fill styles $f_l$ and an area of (unit_area—prj), where unit_area is the unit area of the pixel. The graphic engine creates a sub-pixel region by saving its fill style and area an entry in a pixel cell corresponding to the current pixel. The graphic engine also creates a second sub-pixel region R' having fill style $f_r$ and an area prj in the current pixel. Step 404 is followed by step 422, which ends method 400. Of course, method 400 can be performed for another edge in the pixel or another pixel in the scan line.

In step 406, the graphic engine determines if there is an existent sub-pixel region R in the current pixel with fill style $f_l$. The graphic engine does this by examining the pixel cell of the current pixel to see if there is an entry with the same fill style $f_l$. If so, then step 406 is followed by step 410. If there is not an existent sub-pixel region R in the current pixel with fill style $f_l$, then step 406 is followed by step 408.

In step 408, the graphic engine creates a first sub-pixel region having fill style $f_l$ and a projected area of (unit_area—prj) in the pixel cell. Step 408 is followed by step 414.

In step 410, the graphic engine adds the area of fill style $f_l$ to the area of sub-pixel region R having fill style $f_l$ in the pixel cell. Step 410 is followed by step 412.

In step 412, the graphic engine modularizes the result of step 410 by the unit_area to get the total area of sub-pixel region R with fill style $f_l$. Step 412 is followed by step 414.

In step 414, the graphic engine determines if there is an existent sub-pixel region R' in the current pixel with fill style $f_r$. The graphic engine does this by examining the pixel cell of the current pixel to see if there is an entry with the same fill style $f_r$. If so, then step 414 is followed by step 418. If there is not an existent sub-pixel region R' in the current pixel with fill style $f_r$, then step 414 is followed by step 416.

In step 416, the graphic engine creates a second sub-pixel region R' having fill style $f_r$ and an area prj in the pixel cell. Step 416 is followed by step 422, which ends method 400. Of course, method 400 can be repeated for another edge in the pixel or another pixel in the scan line.

In step 418, the graphic engine adds the area of fill style $f_r$ to the area of sub-pixel region R' having fill style $f_r$. Step 418 is followed by step 420.

In step 422, the graphic engine modularizes the result of step 418 by the unit area of the pixel to get the total area of sub-pixel region R' with fill style $f_r$. Step 412 is followed by step 422, which ends method 400.

Method 400 can be repeated for another edge in the pixel until all the edges are processed. Method 400 can also be repeated fro another pixel in the scan line until all the pixels are processed.

Example 1

Figure 9A:
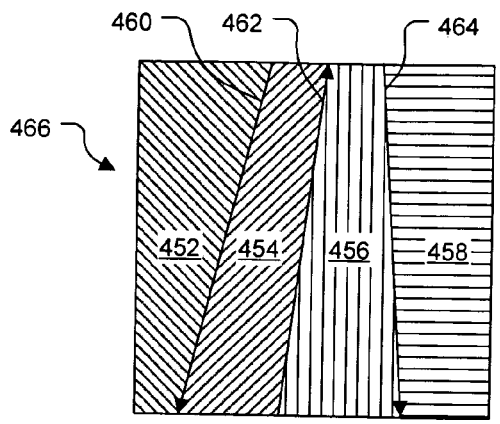
FIGS. 9A, 9B, 9C, 9D, 9E, and 9F illustrate the application of the method of FIG. 8 to edges in a pixel in one embodiment of the invention.
Figure 9B:
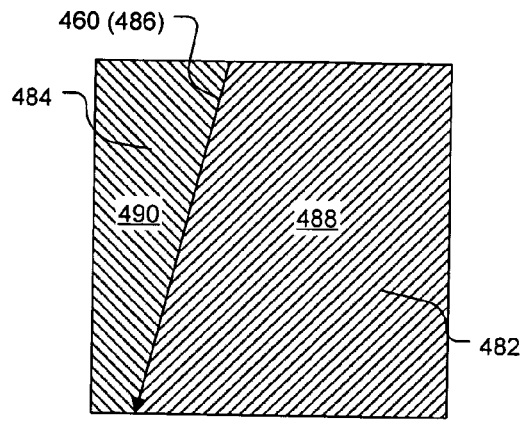
Figure 9C:
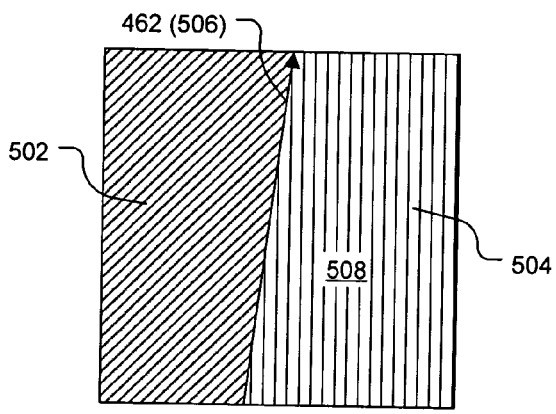
Figure 9D:
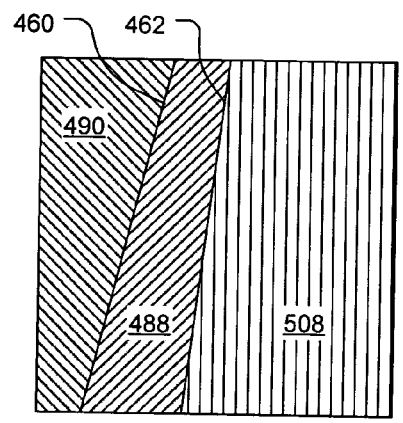
Figure 9E:
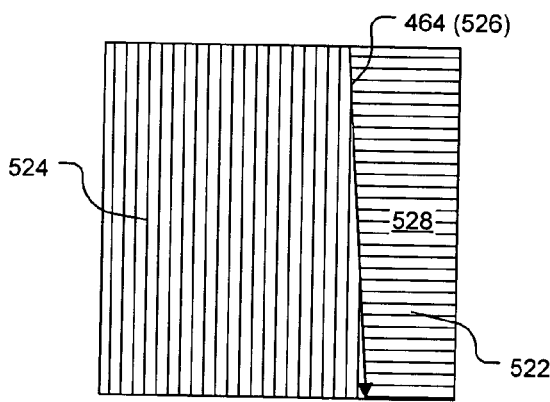
Figure 9F:
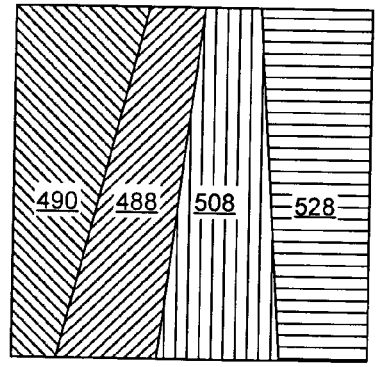

Method 400 is now explained in reference to FIGS. 9A to 9F. FIG. 9A illustrates four sub-pixel regions 452, 454, 456, and 458 formed by three edges 460, 462, and 464 that touch a pixel 466. Each edge is given it left fill style, its right fill style, and its projected area to the right of the edge.

In a first iteration through method 400, assume that the graphic engine processes edge 460. In step 401, the graphic engine receives left fill style 482, right fill style 484, and projected area 486 for edge 460, which is graphically shown in FIG. 9B. In optional step 401A, the graphic engine determines parameter sum_fill for pixel 466 in response to the sum_fill flag for edge 460 and fill styles 482 and 484. In step 402, the graphic engine determines if pixel 466 is empty. As edge 460 is the first edge processed, pixel 466 is empty. Thus, step 402 is followed by step 404. In step 404, the graphic engine creates a first sub-pixel region 488 with fill style 482 and an area of (unit_area—area 486), and a second sub-pixel region 490 with fill style 484 and an area 486 in a pixel cell for pixel 466. Step 404 is followed by step 422, which ends method 400. The result at this point is also graphically shown in FIG. 9B.

In a second iteration through method 400, assume that the graphic engine processes edge 462. In step 401, the graphic engine receives left fill style 502, right fill style 504, and projected area 506 for edge 462, which is graphically shown in FIG. 9C. In optional step 401A, the graphic engine determines parameter sum_fill for pixel 466. In step 402, the graphic engine determines if pixel 466 is empty. Pixel 466 is not empty because it has sub-pixel regions 488 and 490 created by edge 460. Thus, step 402 is followed by step 406.

In step 406, the graphic engine determines if there is a sub-pixel region that matches left fill style 502 of edge 462. As can be seen, sub-pixel region 488 (FIG. 9B) matches left fill style 502. Thus, step 406 is followed by step 410. In step 410, the graphic engine adds (unit_area—area 506) to the area of sub-pixel region 488, which is (unit_area—area 486). In step 412, the graphic engine modularizes the result of step 410 by the unit_area, which is the new area of sub-pixel region 488 graphically shown in FIG. 9D.

In step 414, the graphic engine determines if there is a sub-pixel region that matches right fill style 504 of edge 462. As can be seen, none of the sub-pixel regions matches right file style 504 so step 414 is followed by step 416. In step 416, the graphic engine creates a sub-pixel region 508 with fill style 504 and projected area 506 in the pixel cell. Step 416 is followed by step 422, which ends method 400. The result at this point is graphically shown in FIG. 9D.

In a third iteration through method 400, assume that the graphic engine processes edge 464. In step 401, the graphic engine receives left fill style 522, right fill style 524, and an area 526 for edge 464, which is graphically shown in FIG. 9E. In optional step 401A, the graphic engine determines parameter sum_fill for pixel 466. In step 402, the graphic engine determines if pixel 466 is empty. Pixel 466 is not empty because it has sub-pixel regions 488, 490, and 508 created by edges 460 and 462. Thus, step 402 is followed by step 406.

In step 406, the graphic engine determines if there is a sub-pixel region that matches left fill style 522 of edge 462. As can be seen, none of the sub-pixel regions match left file style 522 so step 406 is followed by step 408. In step 408, the graphic engine creates a sub-pixel region 528 with fill style 522 and an area (unit_area—area 526) in the pixel cell. Step 408 is followed by step 414.

In step 414, the graphic engine determines if there is a sub-pixel region that matches right fill style 524 of edge 464. As can be seen, sub-pixel region 508 (FIG. 9C) matches left fill style 524. Thus, step 414 is followed by step 418. In step 418, the graphic engine adds area 526 to the area of sub-pixel region 508, which is area 506. In step 420, the graphic engine modularizes the result of step 418 by the unit_area, the result of which is the new area of sub-pixel region 508. The final result of the three loops is graphically shown in FIG. 9F, which is the desired output shown in FIG. 9A.

Example 2

Figure 10A:
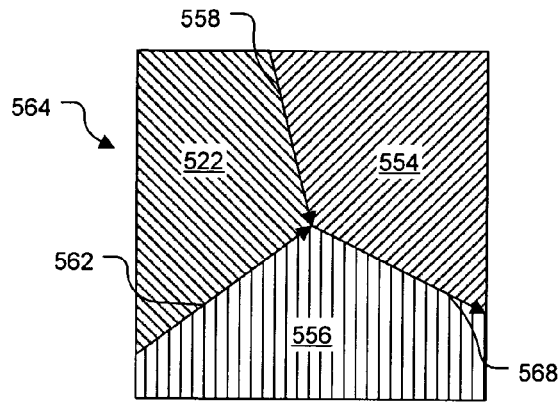
FIGS. 10A, 10B, 10C, 10D, 10E, and 10F illustrate the application of the method of FIG. 8 to edges in a pixel in one embodiment of the invention
Figure 10B:
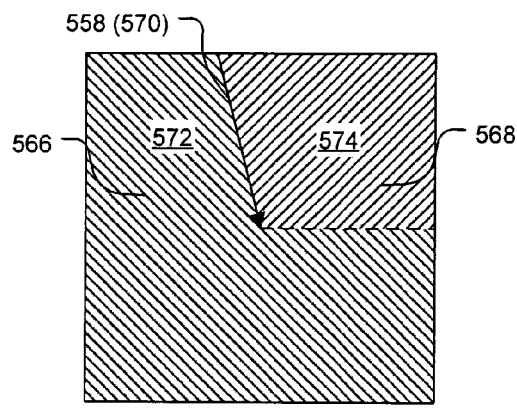
Figure 10C:
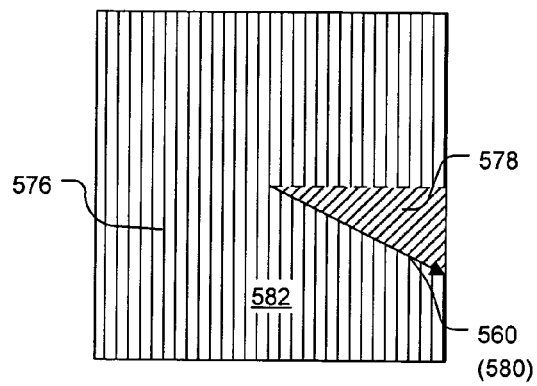

Method 400 is now explained in reference to FIGS. 10A to 10F. FIG. 10A illustrates three sub-pixel regions 552, 554, and 556 formed by three edges 558, 560, and 562 that touch a pixel 564. Each edge is given it left fill style, its right fill style, and its projected area to the right of the edge.

In a first iteration through method 400, assume that the graphic engine processes edge 558. In step 401, the graphic engine receives left fill style 566, right fill style 568, and projected area 570 for edge 558, which is graphically shown in FIG. 10B. In optional step 401A, the graphic engine determines parameter sum_fill for pixel 564 in response to the sum_fill flag for edge 558 and fill styles 566 and 568. In step 402, the graphic engine determines if pixel 564 is empty. As edge 558 is the first edge processed, pixel 564 is empty. Thus, step 402 is followed by step 404. In step 404, the graphic engine creates a left sub-pixel region 572 with fill style 566 and projected area (unit_area—area 570), and a right sub-pixel region 574 with fill style 568 and projected area 570 in a pixel cell for pixel 564. Step 404 is followed by step 422, which ends method 400. The result at this point is also graphically shown in FIG. 10B.

In a second iteration through method 400, assume that the graphic engine processes edge 560. In step 401, the graphic engine receives left fill style 576, right fill style 578, and projected area 580 for edge 560, which is graphically shown in FIG. 10C. In optional step 401A, the graphic engine determines parameter sum_fill for pixel 564. In step 402, the graphic engine determines if pixel 564 is empty. Pixel 564 is not empty because it has sub-pixel regions 572 and 574 created by edge 558. Thus, step 402 is followed by step 406.

In step 406, the graphic engine determines if there is a sub-pixel region that matches left fill style 576 of edge 560. As can be seen, none of the sub-pixel regions matches right file style 576 so step 406 is followed by step 408. In step 408, the graphic engine creates a sub-pixel region 582 with fill style 576 and area (unit_area—area 580) in the pixel cell. Step 408 is followed by step 414.

Figure 10D:
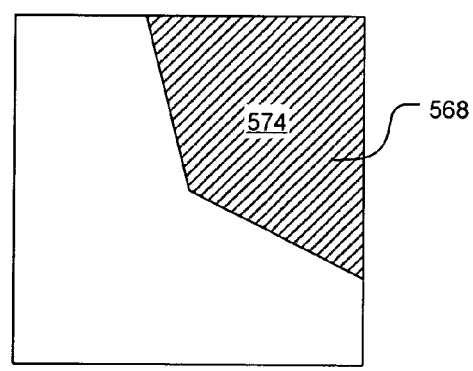
Figure 10E:
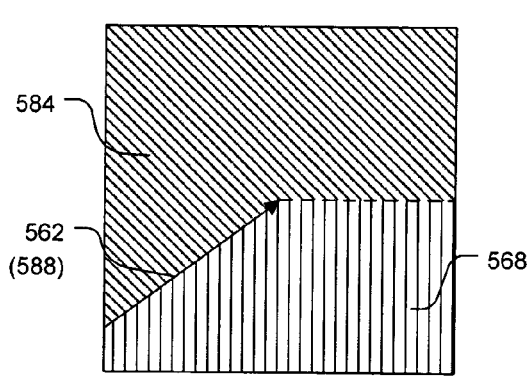
Figure 10F:
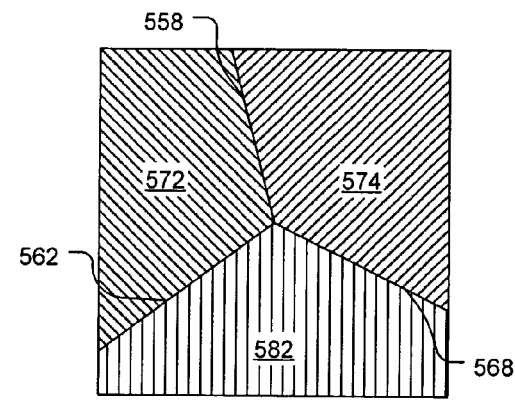

In step 414, the graphic engine determines if there is a sub-pixel region that matches right fill style 578 of edge 560. As can be seen, sub-pixel region 568 (FIG. 10B) matches right fill style 578 so step 414 is followed by step 418. In step 418, the graphic engine adds area 580 to the area of sub-pixel region 574, which is area 570. In step 420, the graphic engine modularizes the result of step 418 by the unit_area, which is the new area of sub-pixel region 574. The result at this point is graphically shown in FIG. 10D. FIG. 10D only shows sub-pixel region 574 because there is ambiguity created by an overlap between sub-pixel regions 572 and 582. As will be evident, the next edge will resolve the ambiguity between sub-pixel regions 572 and 582.

In a third iteration through method 400, assume that the graphic engine processes edge 562. In step 401, the graphic engine receives left fill style 584, right fill style 586, and projected area 588 for edge 562, which is graphically shown in FIG. 10E. In optional step 401A, the graphic engine determines parameter sum_fill for pixel 564. In step 402, the graphic engine determines if pixel 564 is empty. Pixel 564 is not empty because it has sub-pixel regions 572, 574, and 582 created by edges 558 and 560. Thus, step 402 is followed by step 406.

In step 406, the graphic engine determines if there is a sub-pixel region that matches left fill style 584 of edge 562. As can be seen, sub-pixel region 572 (FIG. 10B) matches left fill style 584. Thus, step 406 is followed by step 410. In step 410, the graphic engine adds (unit_area—area 588) to the area of sub-pixel region 572, which is (unit_area—area 570). In step 412, the graphic engine modularizes the result of step 410 by the unit_area, which is the new area of sub-pixel region 572.

In step 414, the graphic engine determines if there is a sub-pixel region that matches right fill style 586 of edge 562. As can be seen, sub-pixel region 582 (FIG. 10C) matches right file style 586 so step 414 is followed by step 418. In step 418, the graphic engine adds area 588 to the area of sub-pixel region 582, which is (unit_area—area 580). In step 420, the graphic engine modularizes the result of step 418 by the unit_area, which is the new area of sub-pixel region 582. The final result of the three loops is graphically shown in FIG. 10F, which is the desired output shown in FIG. 10A.

Fill Style Transferring

As previously described above, the pixel cells are only saved with the fill style and the area of each sub-pixel region without any information on the geometrical relationship between the sub-pixel regions and the edges in the pixel. Typically, the geometrical relationship is used by conventional graphic engine to determine the fill style of an adjacent pixel untouched by any edges. Thus, there is a need for a method that can determine how to fill a pixel untouched by any edges even though the geometrical relationship between sub-pixel regions and the edges is not calculated.

Figure 11A:
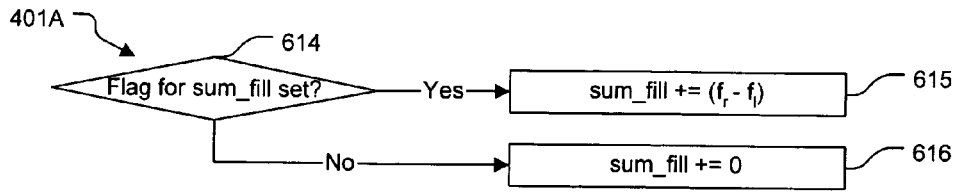
FIGS. 11A and 11B are flowcharts of a method to fill in pixels untouched by edges in a scan line in one embodiment of the invention.
Figure 11B:
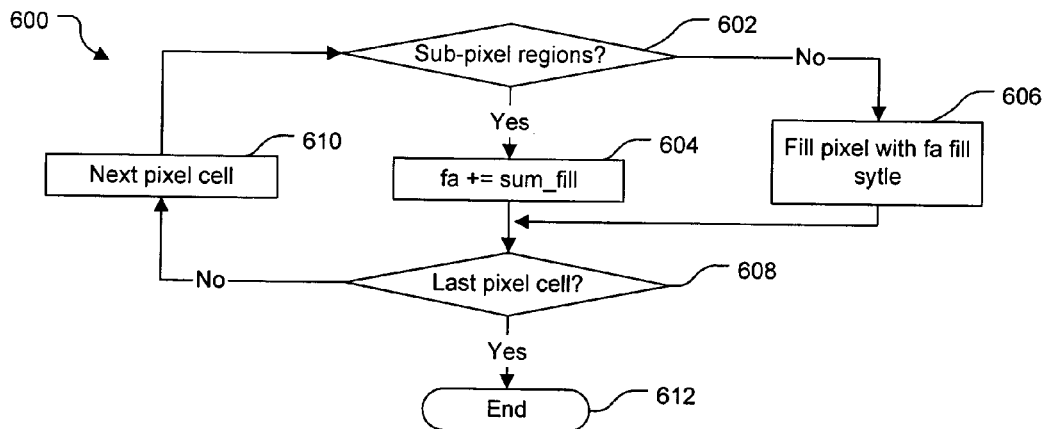
Figure 12:
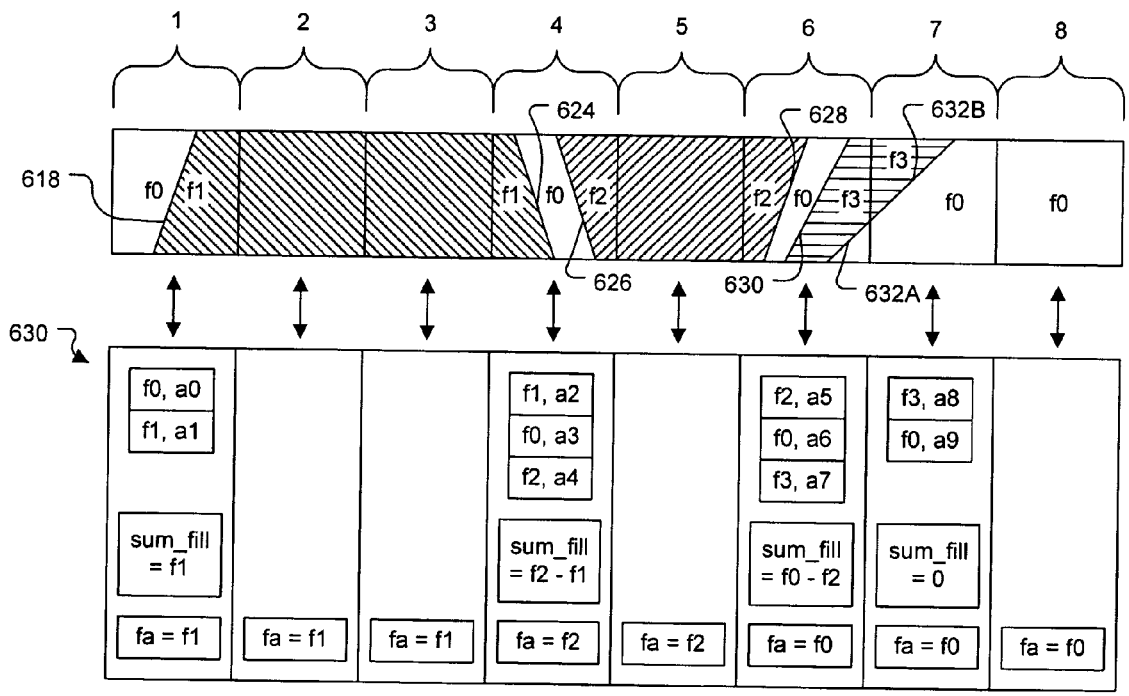
FIG. 12 illustrates the application of the method of FIGS. 11A and 11B to pixels untouched by edges in one embodiment of the invention.

FIGS. 11A and 11B illustrate steps of a method to determine the fill style of pixels that are untouched by any edge in one embodiment. FIG. 11A illustrates a step 401A that is performed between steps 401 and 402 of method 400 in FIG. 8. In step 401A, the graphic engine creates a parameter sum_fill for each pixel cell in buffer 630 (FIG. 12). Each time method 400 processes an edge, the graphic engine updates the sum_fill.

For the method of FIGS. 11A and 11B to work, the sum_fill is incremented with the difference of the right and the left fill styles of an edge only when that edge touches the bottom border of a pixel. An edge touches the bottom border of a pixel when its dy_metering is determined to be greater than GF_ONE in step 238 (FIG. 2B). Thus, the sum_fill flag is set in step 239 (FIG. 2B) to indicate whether or not an edge touches the bottom border of the pixel.

Referring back to FIG. 11A, in step 614, the graphic engine determines if the sum_fill flag was set for the current edge. If the sum_fill flag was set, then step 614 is followed by step 615. Otherwise step 614 is followed by step 616.

In step 615, the graphic engine increments the sum_fill by the difference between the right fill style ($f_r$) and the left fill style ($f_l$). In step 401A, the leftmost and rightmost fill styles in each scan line is set to null.

In step 616, the graphic engine does not increment the sum_fill. Thus, the graphic engine uses the sum_fill flag to determine whether or not to increment the sum_fill with the difference between the right and the left fill styles of each edge in a pixel. The graphic engine will later use the sum_fill parameter to determine how to fill a pixel that does not touch any edges. Step 401A and the sum_fill parameter are explained later and shown in an example.

FIG. 11B is a flowchart of a method 600 implemented by the graphic engine in step 122 (FIG. 1) in one embodiment. In step 602, the graphic engine determines if the current pixel cell in the cell buffer (e.g., cell buffer 630 in FIG. 12) has sub-pixel regions. If so, then step 602 is followed by step 604. If the present pixel cell does not have sub-pixel regions, then step 602 is followed by step 606. A pixel cell has sub-pixel regions if the pixel cell includes fill styles and their corresponding areas (e.g., fill style f0 and area a0, and fill style f1 and area a1 in FIG. 12).

In step 604, the graphic engine increments a parameter "fa" with the sum_fill of the current pixel. Parameter fa is the fill style of pixels to the right of the current pixel that are untouched by any edges. Step 604 is followed by step 608.

In step 606, the graphic engine fills the current pixel cell with the fill style of parameter fa. Step 606 is followed by step 608.

In step 608, the graphic engine determines if the current pixel cell is the last pixel cell in the cell buffer. If not, then step 608 is followed by step 610. Otherwise step 608 is followed by step 612, which ends method 600.

In step 610, the graphic engine progresses to the next pixel cell in the cell buffer and the above step repeats.

FIG. 12 is used to demonstrate the method of FIGS. 11A and 11B. First, the sum_fill of each pixel cell with edges are determined in method 400. A pixel 1 includes an edge 618 having a left fill style f0 and a right fill style f1. As left fill style f0 is the leftmost fill style of the scan line, it is set to null. Thus, the sum_fill for pixel 1 becomes:

$$cell(1).sum\_fill=(f1-f0)=(f1-0)=f1. \qquad (19)$$

A pixel 4 includes (1) an edge 624 having a left fill style f1 and right fill style f0, and (2) an edge 626 having a left fill style f0 and a right fill style f2. Thus, the sum_fill for pixel 4 becomes:

$$cell(4).sum\_fill=(f0-f1)+(f2-f0)=f2-f1. \qquad (20)$$

A pixel 6 includes (1) an edge 628 having a left fill style f2 and a right fill style f0, (2) an edge 630 having a left fill style f0 and a right fill style f3, and (3) an edge 632A having a left fill style f3 and a right fill style f0. Thus, the sum_fill for pixel 6 becomes:

$$cell(6).sum\_fill=(f0-f2)+(f3-f0)+(f0-f3)=f0-f2. \qquad (21)$$

A pixel 7 includes edge 632 having left fill style f3 and right fill style f0. The sum_fill flag for edge 632B in pixel 7 is not set because edge 632B does not touch the bottom of pixel 7. Thus, the sum_fill for pixel 7 becomes:

$$cell(7).sum\_fill=0. \qquad (22)$$

After the sum_fills for the pixel cells are calculated, the fill styles of pixels untouched by any edges are calculated using method 600. For pixel 1, the graphic engine increments fa by cell(1).sum_fill, which is f1. For pixel 2, the graphic engine fills its pixel cell with fa, which is f1. For pixel 3, the graphic engine fills its pixel cell with fa, which is still f1. For pixel 4, the graphic engine increments fa by cell(4).sum_fill (i.e., f1+f2−f1=f2). Thus, fa is now f2. For pixel 5, the graphic engine fills its pixel cell with fa, which is f2. For pixel 6, the graphic engine increments fa by cell(6).sum_fill (i.e., f2+f0−f2=f0). For pixel 7, the graphic engine increments fa by cell(7).sum_fill (i.e., f0+0=f0). For pixel 8, the graphic engine fills its pixel cell with fa, which is now f0.

Using the method of FIGS. 11A and 11B, the graphic engine is able to draw the edges in any natural order by which the 2D figure is formed in various composing tools without changing the result of parameter sum_fill. Furthermore, the graphic engine does not need to calculate the geometrical position of edges that passing through one pixel to determine which is to the right or left of the other.

Various other adaptations and combinations of features of the embodiments disclosed are within the scope of the invention. Numerous embodiments are encompassed by the following claims.

What is claimed is:

1. A computer-implemented method for determining fill styles for pixels in a scan line, the scan line comprising a first pixel having at least one edge, a second pixel without any edges, a third pixel having at least one edge, and a fourth pixel without any edges, the first, the second, the third, and the fourth pixels comprising being along a scan direction of the scan line, the method comprising:

for each edge in the first pixel:
  determining if each edge touches a bottom border of the first pixel;
for each edge that touches the bottom border of the first pixel, incrementing a first fill style parameter by a difference between a right fill style and a left fill style of the edge, wherein the leftmost fill style in the scan line is set to null;
incrementing a second fill style parameter by the first fill style parameter of the first pixel;
filling the second pixel with a first fill style equal to the second fill style parameter;
for each edge in the third pixel, determining if each edge touches a bottom border of the third pixel;

for each edge that touches the bottom border of the third pixel, incrementing a third fill style parameter by a difference between a right fill style and a left fill style of the edge;

incrementing the second fill style parameter by the third fill style parameter of the third pixel;

filling the fourth pixel with a second fill style equal to the second fill style parameter; and displaying the second and the fourth pixels on a display device to a user.

2. The method of claim 1, wherein at least one pair of the first and the second pixels, the second and the third pixels, and the third and the fourth pixels does not comprise consecutive pixels in the scan line.

3. The method of claim 1, wherein at least one pair of the first and the second pixels, the second and the third pixels, and the third and the fourth pixels comprises consecutive pixels in the scan line.

* * * * *